(12) United States Patent
Kimura et al.

(10) Patent No.: US 7,389,999 B2
(45) Date of Patent: Jun. 24, 2008

(54) WHEEL ASSEMBLY

(75) Inventors: Yoshiaki Kimura, Tokyo (JP); Tadashi Imamura, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 255 days.

(21) Appl. No.: 10/559,195

(22) PCT Filed: Jun. 1, 2004

(86) PCT No.: PCT/JP2004/007520

§ 371 (c)(1),
(2), (4) Date: Dec. 2, 2005

(87) PCT Pub. No.: WO2004/108443

PCT Pub. Date: Dec. 16, 2004

(65) Prior Publication Data
US 2007/0057481 A1    Mar. 15, 2007

(30) Foreign Application Priority Data

| Jun. 5, 2003 | (JP) | 2003-161153 |
| Dec. 24, 2003 | (JP) | 2003-427229 |
| Mar. 31, 2004 | (JP) | 2004-103490 |

(51) Int. Cl.
B62D 7/18 (2006.01)

(52) U.S. Cl. ............ 280/93.512; 280/124.125; 280/124.126; 280/124.127

(58) Field of Classification Search ............ 280/93.512, 280/124.125, 124.126, 124.127
See application file for complete search history.

(56) References Cited

U.S. PATENT DOCUMENTS

| 1,041,097 A | 10/1912 | Kennedy |
| 2,537,479 A | 1/1951 | Motte |
| 3,689,101 A * | 9/1972 | Spence et al. .......... 280/124.13 |

(Continued)

FOREIGN PATENT DOCUMENTS

DE    9402564 U1    6/1994

(Continued)

OTHER PUBLICATIONS

Japanese Office Action for Japanese Application No. 2004-098998, dated May 17, 2007 (2 pages).

(Continued)

*Primary Examiner*—Toan C To
(74) *Attorney, Agent, or Firm*—Osha Liang LLP

(57) ABSTRACT

A suspension element is disposed inside of a rim. The upper end of the suspension element is connected to a first support member mounted to a vehicle body. The lower end of the suspension element is connected to a second support member rotatably connected to the disk on the wheel. The shock and vibration from the wheel in the vertical direction are damped and absorbed by the suspension element. Also, a spring mechanism and a flat bearing are disposed in the wheel. The spring mechanism is disposed between a rotating member rotatably supported on the vehicle body and the rim of the wheel. If the rotating member is fixed to a brake drum, braking torque is transmitted to the wheel through the spring mechanism. The flat bearing is disposed between the rim and the rotating member and prohibits the axial movement of the wheel relative to the vehicle body.

23 Claims, 13 Drawing Sheets

U.S. PATENT DOCUMENTS

| | | | | |
|---|---|---|---|---|
| 5,103,530 | A | * | 4/1992 | Andrisin et al. ............... 16/20 |
| 6,113,119 | A | | 9/2000 | Laurent et al. |
| 6,257,604 | B1 | * | 7/2001 | Laurent et al. ......... 280/124.127 |
| 6,789,810 | B2 | * | 9/2004 | Strong ................. 280/124.128 |
| 6,808,190 | B2 | * | 10/2004 | Fornbacher et al. .... 280/93.512 |
| 2002/0175485 | A1 | * | 11/2002 | Tanaka ................. 280/124.125 |
| 2006/0012144 | A1 | * | 1/2006 | Kunzler et al. ......... 280/124.125 |
| 2006/0197305 | A1 | * | 9/2006 | Wichern ..................... 280/283 |
| 2007/0057480 | A1 | * | 3/2007 | Tada et al. ............... 280/124.1 |

FOREIGN PATENT DOCUMENTS

| EP | 0 469 475 | 2/1992 |
|---|---|---|
| EP | 1 118 477 | 7/2001 |
| JP | 62-209241 | 9/1987 |
| JP | 63-31807 | 2/1988 |
| JP | 3-239612 | 10/1991 |
| JP | 10-338009 | 12/1998 |
| JP | 2000-233619 | 8/2000 |
| JP | 2002-370503 | 12/2002 |
| JP | 2003-34103 | 2/2003 |
| JP | 2003-39908 | 2/2003 |

OTHER PUBLICATIONS

Patent Abstracts of Japan for Japanese Publication No. 63-031807, Publication date Feb. 10, 1988 (1 page).

Concise explanation of relevance of D1 (Japanese Patent Application Laid-Open No. S63-031807) to the U.S. Appl. No. 10/559,195 (1 page).

Japanese Office Action for Japanese Application No. 2003-427229, dated Jun. 6, 2007 (2 pages).

Patent Abstracts of Japan for Japanese Publication No. 03-239612, Publication date Oct. 25, 1991 (1 page).

Concise explanation of relevance of D2 (Japanese Patent Application Laid-Open No. H03-239612) to the U.S. Appl. No. 10/559,195 (1 page).

Patent Abstracts of Japan for Japanese Publication No. 62-209241, Publication date Sep. 14, 1987 (1 page).

Concise explanation of relevance of D3 (Japanese Patent Application Laid-Open No. S62-209241) to the U.S. Appl. No. 10/559,195 (1 page).

Supplementary European Search Report dated Aug. 18, 2006; PCT/JP2004007520 (3 pages).

International Search Report for PCT/JP2004/007520 dated Jul. 20, 2004 (2 pages).

Patent Abstracts of Japan No. 2003-034103 dated Feb. 4, 2003 (1 page).

Patent Abstracts of Japan No. 2002-370503 dated Dec. 24, 2002 (1 page).

Patent Abstracts of Japan No. 2003-039908 dated Feb. 13, 2003 (2 page) (listed on Search Report, relates to US 2002-0175485 listed above; therefore, copy not enclosed).

* cited by examiner

WHEEL ASSEMBLY

FIELD OF THE INVENTION

The invention relates to a wheel assembly with a built-in suspension device.

BACKGROUND OF THE INVENTION

A normal suspension device for a wheel of a vehicle will be described with reference to an example of a driven wheel shown in FIG. 26 of Patent Document 1. A rotating drive train of the vehicle is coupled to an output shaft by a universal joint, etc. A tip end of the output shaft is fixed to a wheel disk. Further, a bearing member for rotatably supporting the output shaft is supported via a suspension element and a suspension arm that are disposed on a vehicle body and outside of the wheel.

With this configuration, it is necessary to provide space for disposing the suspension element and the suspension arm, and as a result vehicle design may be restricted, the width of the vehicle increased, and the passenger compartment made smaller.

To address these issues, the present applicant developed the wheel assembly of Patent Document 1. The example shown in FIGS. 1 2 will be used to explain the wheel assembly. A disk and a rim of the wheel are formed from independent components. The disk is coupled to a rotating drive train, and a plurality of short suspension elements is provided between an outer periphery of the disk and an inner periphery of the rim. The suspension elements are positioned at substantially equal distances in the circumferential direction.

According to the above configuration, rotation of the disk is transmitted to the rim and a tire attached to the rim via the plurality of suspension elements. Note that, the tire is sometimes subjected to shock and vibration generated by holes or bumps in the road surface. At these times, suspension elements that happen to be in a raised position soften and absorb the shock and vibration. Since the suspension elements are built into the wheel assembly, there is no need to provide space for disposing a suspension element outside of the wheel.

Patent Document 1: Japanese Patent Application Publication No. JP-A 2002-370503 (FIGS. 1, 2, 26).

DISCLOSURE OF THE INVENTION

Problem to be Solved by the Invention

In the wheel assembly of FIGS. 1, 2 of the above Application Publication, only some of the suspension elements among the plurality of short-length suspension elements provided between the rim and the disk are able to soften and absorb shock and vibration in the up-down direction. Accordingly, the wheel assembly has the weakness that it is not able to perform its softening-absorbing function in a highly effective manner.

Means to Solve the Problem

The invention provides a solution to the above described problems. A wheel assembly including a wheel (10) with a ring-shaped rim (11), comprises a first support member (50; 150) mounted on a vehicle body and extending to an inside of said rim, a second support member (60; 160) coupled to the wheel at the inside of the rim rotatably around a center axis of the wheel, and a suspension element (70) mounted in a generally raised position between the first support member and the second support member at the inside of the rim, the suspension element (70) softening and absorbing up-down direction shock and vibration that is transmitted form the wheel. In this structure, the suspension element is built-in the wheel and thus there is no need to provide space for disposing the suspension element outside of the wheel. Further, since the suspension element is always disposed in the raised position, it is possible to effectively soften and absorb vibration and shock in the up-down direction that is generated by holes or bumps in the road surface.

Preferably, the suspension element (70) is provided as a first suspension element, and a second suspension element (70) is mounted in a generally raised position between the first support member (50; 150) and the second support member (60; 160) at the inside of the rim, the first and the second suspension elements being inclined in different directions to the front and rear with respect to a vertical axis. With this structure, the pair of suspension elements that are inclined in different directions enable vibration and shock in both the up-down direction and the front-rear direction to be softened and absorbed.

Preferably, the wheel assembly further includes a rotating member (20) supported by the vehicle body and disposed at the inside of the rim, and a spring mechanism (30) mounted between an inner periphery of the rim (11) and an outer periphery of the rotating member. The spring mechanism preferably has a plurality of spring elements (35) that are positioned in a circumferential direction. With this structure, the spring mechanism also enables shock in the up-down direction and the front-rear direction of the vehicle to be absorbed and softened.

Preferably, the spring mechanism (30) includes a plurality of first spring receiving portions (31a) which protrude radially inwardly and are positioned at substantially equal distances in the circumferential direction in the inner periphery of the rim (11), and a plurality of second spring receiving portions (32a) which protrude radially outwardly and are positioned at substantially equal distances in the circumferential direction in an outer periphery of a rotating member (20). A compression coil spring (35) that acts as the spring elements is interposed between the first spring receiving portion and the second spring receiving portion that are positioned to face each other in the circumferential direction. With this structure, a simple and low-cost spring mechanism can be provided.

Preferably, the wheel (10) includes a disk (12) provided at a periphery edge of the rim (11) at the opposite side of the rim (11) from the vehicle body, the rotating member (20) is positioned at the vehicle body side, and the suspension element (70) is positioned between the disk and the rotating member. With this structure, the suspension elements are protected by the rotating member and the disk.

Preferably, the first support member (50; 150) includes a shaft (51; 151) and a first bracket (52; 152). The shaft (51; 151) extends in the direction of the center axis of the wheel (10) and passes through the rotating member (20). A tip end portion of the shaft (51; 151) is positioned at the inside of the rim (11). The first bracket (52; 152) is mounted at the tip end portion of the shaft. The second support member (60; 160) includes a second bracket (61; 162) coupled to the disk (12) rotatably around the center axis of the wheel. The first and second brackets include receiving portions (52x, 61x) that face each other in the up-down direction. An upper end and a lower end of the suspension element (70) are respectively coupled to the receiving portions of the first and second brackets. With this structure, the suspension element can be efficiently housed in the space inside of the rim.

Preferably, a bearing (53) is interposed between the shaft (51; 151) of the first support member (50; 150) and the rotating member (20). With this configuration, the rotating member can be stably supported.

Preferably, a lateral force support mechanism (40) is provided between the rotating member (20) and the wheel (10) at the inside of the rim (11). The lateral force support mechanism permits relative displacement of the wheel with respect to the vehicle body in a plane that is orthogonal to the center axis of the wheel and inhibits relative displacement of the wheel in the direction of the center axis of the wheel. With this configuration, the lateral force support mechanism enables axial direction movement of the wheel with respect to the vehicle body to be inhibited, and thus the wheel can be stabilized for stable running.

Preferably, the lateral force support mechanism is a flat bearing (40). The flat bearing has an outer ring (41) fixed to the inner periphery of the rim, an inner ring (42) fixed to the outer periphery of the rotating member, a receiving plate portion (41*a*) which is formed in the outer ring and protrudes radially inwardly, and a receiving plate portion (42*a*) which is formed in the inner ring and protrudes radially outwards. A ball (45) is interposed between the receiving plate portion (41*a*) and the receiving plate portion (42*a*). With this configuration, a large space does not need to be provided within the wheel for accommodating the lateral force support mechanism.

Preferably, the wheel assembly is provided with a lateral force support mechanism (90; 190) which is provided between the first support member (50; 150) and the second support member (60; 160) at the inside of the rim (11). The lateral force support mechanism permits relative displacement of the wheel with respect to the vehicle body in a plane that is orthogonal to the center axis of the wheel, and inhibits relative displacement of the wheel in the direction of the center axis of the wheel. With this configuration, the lateral force support mechanism enables axial direction movement of the wheel with respect to the vehicle body to be inhibited, and thus the wheel can be stabilized for stable running.

Preferably, the lateral force support mechanism is a link mechanism (90; 190). With this configuration, a comparatively simple and low-cost structure for the lateral force support mechanism can be provided.

Preferably, the suspension element is provided as a first suspension element (70), and a second suspension element (70) is positioned in a generally raised position at the inside of the rim (11) between the first support member (150) and the second support member (160). The first and the second suspension elements are positioned respectively to the front and rear of the link mechanism (190) such that the link mechanism (190) is interposed between the first and second suspension elements. Further, the first and second suspension elements are inclined in different directions to the front and rear of the vehicle with respect to a vertical axis. With this configuration, the two suspension elements and the lateral force support mechanism can be efficiently housed in the space within the wheel.

Preferably, the link mechanism (90; 190) includes first and second links (95, 96; 195, 196), and first, second and third connecting joints (91-93; 191-193). The first support member (50; 150) and the first link are rotatably coupled to each other via the first connecting joint. The second support member (160) and the second link are rotatably coupled to each other via the second connecting joint. The first link and the second link are rotatably coupled to each other via the third connecting joint, and the third connecting joint is positioned apart from a line that connects the first and the second connecting joints. With this structure, the link mechanism can be configured with the smallest possible number of component parts.

Preferably, the first support member (50; 150) includes a shaft (51; 151) and a first bracket (52; 152). The shaft (51; 151) extends in the direction of the center axis of the wheel (10) and has a tip end portion that is positioned at the inside of the rim (11). The first bracket (52; 152) is mounted at the tip end portion of the shaft. The second support member (160) includes a second bracket (162) coupled to a disk (12) of the wheel (10) rotatably around the center axis of the wheel. The first and second brackets include receiving portions (52*x*, 162*x*) that face each other in the up-down direction. An upper end and a lower end of the suspension element are respectively coupled to the receiving portions of the first and second brackets, and the first link (95; 195) is coupled to the shaft (51; 151) of the first support member via the first connecting joint (91; 191). With this configuration, the support structure of the suspension element and the connecting structure of the link mechanism can be made simpler.

Preferably, the first, the second and the third joints (191-193) are provided with respective pairs of connecting elements (191*x*-193*x*) that are positioned apart from each other in direction of the center axis of the wheel (10). With this structure, when a rotational moment around an axis that extends in the front-rear direction is applied to the wheel, the load can be adequately supported, and thus the wheel can be supported in a stable manner.

Preferably, the suspension elements (70), the first, the second and the third connecting joints (191-193), and the first and the second links (195, 196) are substantially positioned on the same vertical plane, this vertical plane being orthogonal to the center axis of the wheel. With this structure, it is possible to minimize the space required for accommodating the link mechanism.

Preferably, the first, the second and the third connecting joints (191-193) include bearings (191*x*-193*x*) that receive both radial force and lateral force. With this configuration, the structure of the link mechanism is simple and can be manufactured at low-cost. Further, the bearings are strong and have high durability.

Preferably, the first link (195) extends downward, and the first bracket (152) has a pair of stoppers (152*c*) which are positioned at opposite sides of the first link and restrict a rotational range of movement of the first link. With this structure, the movement range of the wheel with respect to the vehicle body in the front-rear direction is reliably restricted using a simple structure.

Preferably, the first connecting joint (191) has an outer tube (191*a*), and the bearing (191*x*) is provided between the outer tube and the shaft (151) of the first support member (150). The second connecting joint (192) and the third connecting joint (193) have respective short shafts (192*b*, 193*b*) and respective outer tubes (192*a*, 193*a*). The bearings (192*x*, 193*x*) are provided between the respective short shafts and the outer tubes. The outer tube of the second connecting joint is fixed to the second bracket (162), and opposite ends of the first link (195) are fixed to the outer tube of the first connecting joint and the outer tube of the third connecting joint. Further, opposite ends of the second link (196) are fixed to the short shaft of the second connecting joint and the short shaft of the third connecting joint. Openings (192*w*, 193*w*) are respectively formed in the outer tubes of the second and the third connecting joints. The second link passes through the openings (192*w*, 193*w*) and is capable of rotating within a predetermined angular range. The opposite ends of the openings in a circumferential direction act as stoppers that regulate the angular range of rotation of said second link. With this configuration, a simple structure can be used to regulate the movement range of the wheel with respect to the vehicle body in the up-down direction.

Preferably, the first, the second and the third connecting joints (91-93) include respective rubber bushes. With this structure, elasticity of the rubber bushes enables up-down direction, front-rear direction, and rotational direction vibration and shock that is transmitted from the wheel to be softened and absorbed. Further, breakdown caused by dust, sand, etc. is prevented.

In one form of the invention, the rotating member (20) is coupled to a rotating element (100) of a brake, and brake torque of the brake is transmitted to the wheel (10) via the rotating member and the spring mechanism (30).

In another form of the invention, the rotating member (20) is coupled to a rotating drive train of the vehicle, and drive torque from the rotating drive train is transmitted to the wheel via the rotating member and the spring mechanism (30).

Effects of the Invention

According to the invention, it is not necessary to provide space for disposing a suspension element outside of a wheel. Further, the suspension element is able to effectively soften and absorb vibration and shock in an up-down direction that is generated by holes or bumps in the road surface.

BEST MODE FOR CARRYING OUT THE INVENTION

Hereinafter, a wheel assembly for a non-driven wheel of a vehicle according to a first embodiment of the invention will be explained with reference to FIGS. 1 to 4. As shown in FIG. 1, the wheel assembly includes a wheel 10 and a suspension device S built into the wheel 10. The suspension device S includes a rotating member 20, a spring mechanism 30, a flat bearing 40 (a lateral force support mechanism or a thrust load support mechanism), a first support member 50, a second support member 60, and two suspension elements 70.

The wheel 10 has a rim 11 and a disk 12. A tire (not shown) is fitted to an outer periphery of the rim 11, and the disk 12 is fixed to a periphery edge portion of the rim 11 at the opposite side to a vehicle body. The rim 11 has a small-diameter rim drop 11c that is necessary for fitting the tire. The disk 12 has a work hole 12a in its center, and decorative holes 12b are provided around the work hole 12a. A short tubular support portion 12c is formed to protrude toward the vehicle body side at the periphery edge of the work hole 12a.

The rotating member 20 is provided at an inside of a periphery edge of the rim 11 at the vehicle body side. The rotating member 20 is positioned parallel to the disk 12 and faces the disk 12 with a distance of separation therebetween. The rotating member 20 has a disk portion 21, a short tubular support portion 22, and a short tubular support portion 23. The disk portion 21 has a hole 21a in its center. The tubular support portion 22 protrudes toward the vehicle body in the axial direction from an outer periphery edge of the disk portion 21. The tubular support portion 23 protrudes from the disk portion 21 in the axial direction opposite from the vehicle body. The tubular support portion 23 has a smaller diameter than the tubular support portion 22.

The rotating member 20 is fixed to a brake drum 100 (brake rotating element) of the vehicle via an attachment 80. The attachment 80 includes a first attachment ring 81, a second attachment ring 82 that has a larger diameter than the first attachment link 81, and a plurality of legs 83 that straddle between the rings 81, 82. The rotating member 20 is connected to the attachment 80 by bolts 25 that pass through the disk portion 21 of the rotating member 20 and that are screwed into bolt holes 81a of the first attachment ring 81. On the other hand, bolts 101 protrude from the brake drum 100 and pass through holes 82a formed in the second attachment ring 82. Nuts 85 are screwed to the bolts 101 and tightened, whereby the rotating member 20 is fixed to the brake drum 100 via the attachment 80.

The spring mechanism 30 is disposed at a vehicle body side between the inner periphery of a periphery edge portion of the rim 11 of the wheel 10 and the outer periphery of the tubular support portion 22 of the rotating member 20. As shown in FIGS. 1, 2, the spring mechanism 30 includes an outer spring receiving ring 31, an inner spring receiving ring 32, and a plurality of compression coil springs 35 (spring members) that have the same specifications. There are in this example ten of the compression coil springs 35. The outer spring receiving ring 31 is fixed by welding to an inner periphery surface of the rim 11 (the welded portion is indicated by reference number 31x shown in FIGS. 1, 4), and has a plurality of (five, for example) spring receiving portions 31a (first spring receiving portions). The spring receiving portions 31a have a substantially triangular shape and protrude radially inwardly. The spring receiving portions 31a are positioned at substantially equal distances in the circumferential direction. Washers 33 (spring receiving washers) are fixed to opposite faces of each spring receiving portion 31a in the circumferential direction. The inner spring receiving ring 32 is fixed by welding to an outer periphery surface of the tubular support portion 22 of the rotating member 20 (the welded portion is indicated by reference number 32x), and has a plurality of (five, for example) spring receiving portions 32a (second spring receiving portions). The spring receiving portions 32a have a substantially triangular shape and protrude radially outwardly. The spring receiving portions 32a are also positioned at substantially equal distances in the circumferential direction. Each spring receiving portion 32a is positioned between two neighboring spring receiving portions 31a. Washers 34 (spring receiving washers) are fixed to opposite faces of each spring receiving portion 31a in the circumferential direction. Each compression coil spring 35 is interposed between the washer 33 of the spring receiving portion 31a on the rim 11 and the washer 34 of the spring receiving portion 32a on the rotating member 20. The washers 33 and 34 face each other in the circumferential direction. The total of ten compression coil springs 35 are positioned on respective edges of a star-like shape that is centered on a center axis of the wheel 10 (this star-like shape is indicated by the dot-dash line of FIG. 2).

The flat bearing 40 is formed as a disk-shaped unit and is positioned between the spring mechanism 30 and the rim drop 11c. The flat bearing 40 has an outer ring 41 and an inner ring 42. The outer ring 41 is formed by a pair of halves 41x which have the same shape and which are connected by bolts and nuts. Similarly, the inner ring 42 is formed by a pair of halves 42x which have the same shape and which are connected by bolts and nuts. Each half 41x of the outer ring 41 is formed with a plurality of (five, for example) receiving plates 41a that protrude radially inwardly to form a mountain-like profile. The receiving plates 41a are disposed at substantially equal distances in the circumferential direction. The receiving plates 41a of the half 41x on the vehicle body side and the receiving plates 41a on the half 41x on the side opposite to the vehicle body are positioned out of phase with each other (at different angular positions). Thereby, the receiving plate 41a of one of the halves 41x is positioned between two neighboring receiving plates 41a of the other half 41x.

Each half 42x of the inner ring 42 is formed with the same number of receiving plates 42a as the receiving plates 41a, and these receiving plates 42a protrude radially outwardly to form a mountain-like profile. The receiving plates 42a are disposed at substantially equal distances in the circumferential direction. The receiving plates 42a of the half 42x on the vehicle body side and the receiving plates 42a on the half 42x on the side opposite to the vehicle body are positioned out of phase with each other. Thereby, the receiving plate 42a of one of the halves 42x is positioned between two neighboring receiving plates 42a of the other half 42x.

A plate-like retaining rings 43 are respectively provided between the receiving plates 41a, 42a of the halves 41x, 42x at the vehicle body side and the receiving plates 41a, 42a of the halves 41x, 42x at the side opposite to the vehicle body.

As shown in the upper section of FIG. 1, the receiving plates 41a of the half 41x at the vehicle body side, and the receiving plates 42a of the half 42x at the side opposite to the vehicle body face each other. Similarly, as shown in the lower section of FIG. 1, the receiving plates 41a of the half 41x at the side opposite to the vehicle body and the receiving plates 42a of the half 42x at the vehicle body side face each other. Seats 44 are fitted into facing surfaces of the receiving plates 41a, 42a. Balls 45, which are steel balls, are interposed between the seats 44. Each ball 45 is rotatably housed in a respective retaining tube 46 that is fitted in a hole of a retaining ring 43.

Thin seal plates 47 are respectively fixed to the outer ring 41 and the inner ring 42 of the vehicle body side. These seal plates 47 are in surface contact with each other and can be moved relative to each other. Similarly, seal plates 47 are also respectively fixed to the outer ring 41 and the inner ring 42 at the side opposite to the vehicle body. These four seal plates 47 cover an inner space of the flat bearing 40.

Next, a support structure for the flat bearing 40, which is formed as a unit, will be explained. The outer ring 41 of the flat bearing 40 is fixed to the rim 11 such that the outer periphery surface of the outer ring 41 contacts with the inner periphery surface of the rim 11, and such that the outer ring 41 is sandwiched between the rim drop 11c and the outer spring receiving ring 31 of the spring mechanism 30. A circular recess is formed between the seal plates 47 fixed to the outer ring 41 and the rim drop 11c. Filling material 49, such as silicone, is filled into the circular recess.

On the other hand, the inner ring 42 of the flat bearing 40 is welded to the tubular support portion 23 of the rotating member 20 such that the inner periphery surface of the inner ring 42 is in contact with the outer periphery surface of the tubular support portion 23, and such that the side surface of the inner ring 42 at the vehicle body side abuts with the disk portion 21 of the rotating member 20. The welding portion is indicated with the reference number 23x. Accordingly, the inner ring 42 is fixed to the rotating member 20.

The receiving plates 41a of the half 41x of the outer ring 41 are away from the outer periphery surface of the half 42x of the inner ring 42 that is on the same side, and the receiving plates 42a of the half 42x of the inner ring 42 are away from the inner periphery surface of the half 41x that is on the same side. Accordingly, the outer ring 41 and the inner ring 42 can be moved radially relative to each other. Further, the receiving plates 41a, 42a of the halves 41x, 42x on the same side are separated from each other in the circumferential direction, and thus the outer ring 41 and the inner ring 42 can be moved relative to each other in the circumferential direction. As a result, the wheel 10 can be moved relatively with respect to the rotating member 20 on a vertical plane that is orthogonal to the center axis of the wheel 10. The balls 45 are interposed between the receiving plates 41a, 42a of the halves 41x, 42x. Thereby, the outer ring 41 and the inner ring 42 are inhibited from moving relatively in the center axis direction of the wheel 10. Thus, the wheel 10 is inhibited from moving relatively in the center axis direction with respect to the rotating member 20. In other words, lateral force (thrust load) from the wheel 10 is received by the rotating member 20.

As shown in FIG. 1, the first support member 50 includes a shaft 51 that extends along the center axis of the wheel 10 and a bracket 52 (first bracket). The shaft 51 passes through the rotating member 20 and the attachment 80 and has an end portion at the side opposite to the vehicle body that is positioned substantially centrally in the width direction of the rim 11. A radial bearing 53 is interposed between the shaft 51 and the first attachment ring 81 of the attachment 80 thus enabling the rotating member 20 to be supported by the shaft 51 in a rotatable manner. A screw hole 51a is formed in the end surface of the shaft 51 at the vehicle body side. A screw 105a at a tip end of a brake axle 105 is screwed into this screw hole 51a. As a result, the shaft 51 is fixed to the brake axle 105. The other end of the brake axle 105 is fixed to the vehicle body. In this embodiment, the brake axle 105 forms one section of the shaft 51, and thus forms one section of the first support member 50. The rotating member 20 is supported by the vehicle body via the attachment 80, the bearing 53, the shaft 51, and the brake axle 105, and is also supported by the vehicle body via the attachment 80, the brake drum 100, and the brake axle 105.

An engagement protrusion 51b with a hexagonal column shape is formed at the end portion of the shaft 51 at the side opposite to the vehicle body. The engagement protrusion 51b is fitted into an engagement hole 52a with a hexagonal shape in a lower end portion of the bracket 52. A bolt 55 is screwed onto the engagement protrusion 51b. The lower end portion of the bracket 52 is fixed to the tip end portion of the shaft 51 in a non-rotatable manner by sandwiching the lower end portion of the bracket 52 between a washer 56 and a stepped portion of the shaft 51. Another stepped portion is formed in a intermediate section of the shaft 51. The radial bearing 53 and a tubular spacer 59 are interposed between this stepped portion and the bracket 52.

On the other hand, the second support member 60 is formed from a bracket 61 (second bracket). This bracket 61 is ring shaped. A radial bearing 65 is interposed between the inner periphery of the bracket 61 and the outer periphery of the tubular support portion 12c of the disk 12. As a result, the bracket 61 is coupled to the disk 12 so as to be capable of rotation around the center axis of the wheel 10.

As shown in FIGS. 1, 3, 4, the suspension elements 70 is disposed in a raised position between the first bracket 52 and the second bracket 61. The suspension elements 70 are away from each other in the front-rear direction of the vehicle. More specifically, the bracket 52 extends upwards from the shaft 51. An arc-shaped boss 52x (receiving portion) that protrudes in the opposite direction from the vehicle body is formed in the wide top edge portion of the bracket 52. On the other hand, the bracket 61 is provided with a pair of legs 61a which are away from each other in the front-rear direction of the vehicle body and extend downward. Respective bosses 61x (receiving portions) that protrude to the vehicle body side are formed at the lower end of the legs 61a. The two suspensions elements 70 are respectively coupled at their upper ends to opposite ends of the boss 52x of the first bracket 52. Further, the lower ends of the suspension elements 70 are respectively connected to the pair of bosses 61x of the second bracket 61. The suspension elements 70 are inclined such that the distance between them decreases in the upward direction. In other words, the two suspension elements 70 are inclined in different directions in the front-rear direction of the vehicle with respect to the vertical axis. More particularly, a first one of the suspension elements 70 is inclined in the rear direction with respect to the vertical axis and a second one of the suspension elements 70 is inclined in the forward direction with respect to the vertical axis.

Each suspension element 70 comprises a fluid damper 71 (damper, shock absorber) and a compression coil spring 76 that is a return spring. The fluid damper 71 includes a cylinder 72, a piston (not shown), and a rod 73. The cylinder 72 contains a fluid like oil, the piston has an orifice and is housed in the cylinder 72 so as to be capable of movement in the axial direction. The rod 73 has a lower end fixed to the piston and extends upward so as to protrude from the cylinder 72. A lower end of the cylinder 72 is rotatably connected to the boss 61x of the second bracket 61 via a rubber bush 74. A top end of the rod 73 has a head 73a. The head 73a is rotatably connected to the boss 52x of the first bracket 52 via a rubber bush 75. The rubber bushes 74, 75 have a structure that is known in the automobile field, and thus an explanation will be omitted here.

A spring receiving member 77 abuts with the head 73a of the rod 73, and a spring receiving member 78 is fixed to an outer periphery of a lower portion of the cylinder 72. The compression coil spring 76 is interposed between both spring receiving members 77, 78.

The flat bearing 40 and the suspension elements 70 are arranged in the axial direction of the wheel 10 between the rotating member 20 and the disk 12.

Next, the operation of the wheel assembly with the above configuration will be described.

In the wheel assembly, the suspension elements 70 are housed inside of the rim 11. Accordingly, there is no need to provide space for the suspension elements 70 outside of the wheel assembly. Further, the spring mechanism 30 and the flat bearing 40 are also housed inside of the rim 11. Thus, there is no need to provide space for these structural members outside of the wheel assembly.

The weight of the vehicle is supported by the tire fitted to the rim 11 of the wheel 10 via the first support member 50, the compression coil springs 76 of the suspension elements 70, the second support member 60, and the disk 12.

When the vehicle is running, the first support member 50, the second support member 60, and the suspension elements 70 do not rotate, and the suspension elements 70 remain in the raised position. The radial bearing 65 between the wheel 10 and the second support member 60 allows the wheel 10 to rotate. Since the rotating member 20 is coupled to the wheel 10 via the spring mechanism 30, the rotating member 20 rotates along with rotation of the wheel 10. Further, since the brake drum 100 is coupled to the rotating member 20 via the attachment 80, the brake drum 100 also rotates along with the wheel 10.

When the vehicle runs over a hole or bump in the road surface, vertical and lateral impact load is applied to the wheel 10 through the tire. At this time, the flat bearing 40 allows relative displacement of the wheel 10 with respect to the rotating member 20 in the up-down direction and front-rear direction. The vertical impact load is softened and absorbed by the compression coil springs 76 and the fluid damper 71 of the suspension elements 70. Thus, the impact and vibration transmitted to the vehicle body through the first support member 50 is substantially reduced. Further, the suspension elements 70 are inclined in the front-rear direction and thus are able to absorb and soften impact and vibration in the front-rear direction.

Since the suspension elements 70 do not contract as a result of rotation of the wheel 10, energy loss is small and it is possible to lengthen the working life of the suspension elements 70 and particularly the working life of the fluid damper 71. Moreover, since the suspension elements 70 can be made comparatively long, the suspension elements 70 can perform their vibration/impact softening-absorbing function effectively.

The spring mechanism 30 is interposed between the rotating member 20 and the wheel 10. The ten compression coil springs 35 of the spring mechanism 30 are positioned such that their axes respectively lie in the up-down direction, the front-rear direction and an inclined direction. As a result, it is possible to absorb and soften impact and vibration from the wheel 10 to the rotating member 20 in the up-down direction and the front-rear direction.

As described previously, relative movement of the wheel 10 with respect to the rotating member 20 in the center axis direction is inhibited, and thus relative axial direction movement of the wheel 10 with respect to the vehicle body is also inhibited. Accordingly, stable running can be achieved. Further, since relative axial direction movement of the wheel 10 with respect to the rotating member 20 is inhibited, the suspension elements 70 positioned between the support members 50, 60 can be protected.

When a vehicle brake is operated, rotation of the brake drum 100 with respect to the brake axle 105 is stopped, whereby brake torque of the brake drum 100 is transmitted to the wheel 10 via the attachment 80, the rotating member 20 and the spring mechanism 30. As a result the vehicle is stopped.

Next, a second embodiment of the invention will be explained with refernce to FIGS. 5, 6. The structure of the second embodiment is extremely similar to that of the first embodiment, and thus structural members that correspond to those in the first embodiment will be denoted with the same reference numerals and an explanation omitted here. In the second embodiment, the wheel assembly is used for a driven wheel. More specifically, by using a bolt 25, the rotating member 20 is directly connected or connected via an attachment to an end section of the rotating drive train of the vehicle driven by an engine, an electric motor or the like as a power source. Drive torque from the rotating drive train is transmitted to the rotating member 20 and then transmitted to the wheel 10 via the spring mechanism 30. The operation of the suspension elements 70 and the spring mechanism 30 that soften and absorb vibration and shock is the same as in the first embodiment. In the second embodiment as well, the end section of the rotating drive train or the attachment is rotatably supported by the shaft 51 via a bearing. The bearing may be omitted from the structure. The shaft 51 extends toward the vehicle body and is fixed to the vehicle body.

In the second embodiment, as in the first embodiment, the spring mechanism 30 is also provided with the ten compression coil springs 35, which are positioned such that respective pairs of the compression coil springs 35 are coaxial with each other on respective edges of a regular pentagon. When the vehicle is running, load applied from the compression coil spring 35 to the vehicle varies along with rotation of the wheel 10. In the first and second embodiments, ten of the compression coil springs 35 are used and positioned at substantially equal distances in the circumferential direction. It has been shown experimentally that the load variation with ten compression coil springs 35 is substantially reduced as compared with the case where eight or twelve compression coil springs 35 are used.

In the second embodiment, when a motor is used, a rotor fixed to the output shaft of the motor may be utilized as the rotating member.

Further, in the first and second embodiments, the rotating member 20 may be only rotatably supported by the shaft 51 via a bearing.

Next, a third embodiment of the invention will be explained with reference to FIGS. 7 to 12. Structural members of the third embodiment that correspond to those in the first embodiment will be denoted with the same reference numerals and an explanation omitted. FIG. 7 shows a wheel assembly to which a tire 19 is fitted.

In the third embodiment, the disk portion 21 of the rotating member 20 is provided at its outer periphery with one tubular support portion 24. The spring mechanism 30 is provided between the tubular support portion 24 and the periphery edge portion of the rim 11 on the vehicle body side. The bearing 53 is interposed between the inner periphery of the hole 21a of the disk portion 21 and the shaft 51 of the first support member 50. Accordingly, the rotating member 20 is supported by the shaft 51 without providing an attachment, and thus the rotating member 20 is supported by the vehicle body.

On the other hand, a second support portion 160 has a short shaft 161 and a bracket 162 (second bracket). The shaft 161 is positioned coaxially with the shaft 51, and is rotatably supported by the wheel 10 via a bearing 165 that is disposed in a support hole 12x of the disk 12 of the wheel 10.

A tip end of the shaft 161 faces the space inside of the rim 11, namely, the space inside of the wheel 10. The bracket 162 has a J-shaped cross section, and an upper end portion of a vertical section thereof is fixed to the tip end of the shaft 161. A horizontal section 162x (receiving portion) of the bracket 162 extends toward the vehicle body and is positioned directly beneath the boss 52x of the bracket 52 of the first support portion 50. In a similar manner to the first embodiment, lower ends of the two suspension elements 70 are coupled to the horizontal section 162x.

In the third embodiment, a link mechanism 90 is used instead of the flat bearing 40 of the first embodiment as a lateral force support mechanism. The link mechanism 90 is provided between the shaft 51 of the first support member 50 and an upright tab 162y of the bracket 162 of the second support member 160. The link mechanism 90 is accommodated within the space between the rotating member 20 and the disk 12, and is arranged in the axial direction with the suspension elements 70.

The link mechanism 90 includes first and second links 95, 96, and first to third connecting joints 91 to 93. The links 95, 96 and the connecting joints 91 to 93 are positioned on a vertical plane that is orthogonal to the center axis of the wheel 10. The connecting joints 91 to 93 are each formed from a single rubber bush (connecting member). The axes of the rubber bushes 91 to 93 are parallel with the center axis of the wheel 10.

As shown in FIGS. 8 to 11, each of the rubber bushes 91 to 93 are the same as the type of suspension arm bush that is normally used in a vehicle. The rubber bushes 91 to 93 respectively include rubber layers 91a to 93a (intermediate elastic layers made from rubber or the like), outer tubes 91b to 93b that are made of steel (rigid material) and fixed to the outer periphery of the rubber layers 91a to 93a, inner tubes 91c to 93c that are made of steel (rigid material) and fixed to the inner periphery of the rubber layers 91a to 93a, a pair of stoppers 91d to 93d fixed to opposite ends of the inner tubes 91c to 93c. The stoppers 91d to 93d include steel end plates 91d' to 93d' that face the end surfaces of the outer tubes 91b to 93b and are fixed to opposite ends of the inner tubes 91c to 93c, and ring-shaped protruding portions 91d'' to 93d'' made of rubber are attached to the end plates 91d' to 93d' and face the outer tubes 91b to 93b.

The rubber layer 91a to 93a are do not compressively deform along with change in their volume, but do elastically deform due to shear stress. Accordingly, in each rubber bush 91 to 93, the outer tubes 91b to 93b and the inner tubes 91c to 93c cannot be relatively displaced with respect to each other in the direction orthogonal to the axis lines but can relatively rotate around the axis lines within a predetermined angular range. Further, relative displacement in the axial direction of the outer tubes 91b to 93b and the inner tubes 91c to 93c is regulated to a very slight amount by the stoppers 91d to 93d.

As shown in FIGS. 7 to 9, the tip end portion of the shaft 51 of the first support member 50 is inserted in the inner tube 91c of the first rubber bush 91. The inner tube 91c is fixed to the shaft 51 together with the bracket 52 by a nut 97 screwed onto the shaft 51. Thus, the axis line of the first rubber bush 91 is aligned with the shaft 51, and substantially aligned with the center axis of the wheel 10.

As shown in FIGS. 7, 8, the inner tube 92c of the second rubber bush 92 is fixed to the upright tab 162y of the bracket 162 of the second support member 160 by a bolt 98a that passes through the inner tube 92c and a nut 98b. The second rubber bush 92 is positioned directly beneath the first rubber bush 91 such that a line connecting between them is substantially vertical.

As shown in FIG. 8, the third rubber bush 93 is positioned apart from the line (vertical line) connecting the rubber bushes 91, 92 in the front-rear direction. As shown in FIGS. 8 to 10, opposite ends of the first link 95 are fixed to the outer tubes 91b, 93b of the rubber bushes 91, 93.

As shown in FIGS. 8, 11, one end of the second link 96 is fixed to the outer tube 92b of the second rubber bush 92. A pair of facing attachment tabs 96a is formed at the other end of the second link 96. The stopper 93d of the third rubber bush 93 is sandwiched between the attachment tabs 96a. A nut 99b is tightened onto a bolt 99a that passes through the inner tube 93c so as to fix the second link 96 to the inner tube 93c of the third rubber bush 93.

Next, the operation of the link mechanism 90 will be explained in more detail. As explained previously, the outer tube 91b to 93b and the inner tube 91c to 93c of each rubber bush 91 to 93 are inhibited from moving relatively in the axial direction. Accordingly, the support members 50 and 160 coupled via the link mechanism 90 are inhibited form moving relatively in the direction along the center axis of the wheel 10. As a result, axial direction relative movement of the wheel 10 with respect to the vehicle body is inhibited, whereby stable running of the vehicle is made possible. Further, due to inhibiting axial direction relative movement of the support members 50 and 160, the suspension elements 70 positioned between the support members 50 and 160 can be protected.

The outer tubes 91b to 93b and the inner tubes 91c to 93c of the first to third rubber bushes 91 to 93 are respectively capable of relative rotation within the predetermined angular range. Thus, as shown in FIG. 12, when the first rubber bush 91 on the vehicle body side is taken as a reference, the second rubber bush 92 on the wheel 10 side can move relatively in the vertical plane within a predetermined region A. The theoretical explanation for this will be explained briefly here. In FIG. 12, reference letters Ox to Oz represent the center axes of the first to third rubber bushes 91 to 93. The axis line Oz of the third rubber bush 93 can be displaced with respect to the axis line Ox of the first rubber bush 91 within an angular range Θa, namely, between points Pa, Pb. Further, when the axis line Oz of the third rubber bush 93 is positioned at point Pa, the axis line Oy of the second rubber bush 92 can be displaced in an angular range Θb, namely, between points Pc, Pd. Moreover, when the axis line Oz of the third rubber bush 93 is positioned at point Pb, the axis line Oy of the second rubber bush 92 can be displaced within an angular range Θc, namely, between points Pe, Pf. Note that, in this embodiment, Θa=Θb=Θc.

As described previously, the second rubber bush 92 can be displaced with respect to the first rubber bush 91 within the predetermined region A, and thus the second support member 160 can be displaced within the predetermined region A with respect to the first support member 50. As a result, the link mechanism 90 permits the displacement of the wheel 10 in the up-down direction and front-rear direction, and rotation of the wheel 10 around the center axis of the wheel 10 with respect to the vehicle body. Thus, the link mechanism 90 does not obstruct the operation of the suspension elements 70 and the spring mechanism 30. Note that, the link mechanism 90 also functions to assist softening of vibration and shock in the above mentioned three directions due to the elasticity of the rubber layers 41a, 42a, 43a.

In the third embodiment, the wheel assembly is used for a non-driven wheel. The shaft 51 is fixed to the vehicle body, and the rotating member 20 is supported via the bearing 53 by the shaft 51. Thus, the rotating member 20 is rotatably supported by the vehicle body. The spring mechanism 30 does not fulfill a rotation transmission function, and simply softens vibrations etc. in the up-down direction, the front-rear direction, and the rotation direction. The wheel assembly with this structure may be applied to a lightweight vehicle, or a carriage that is pushed.

In the third embodiment, the rotating member 20 may be fixed to the brake drum in the same manner as in the first embodiment. In this case, brake torque from the brake drum is transmitted to the wheel 10 via the rotating member 20 and spring mechanism 30. In addition, the wheel assembly may be used for a driven wheel. In this case, the rotating member 20 is coupled to the rotating drive train.

In the third embodiment, the stoppers of the rubber bushes may be provided for the outer tubes or may be provided for the support members 50, 160 or the links fixed to the rubber bushes.

Next, a wheel assembly according to a fourth embodiment of the invention will be explained with reference to FIGS. 13 to 15. In the fourth embodiment, structural members that are the same as those of the first and third embodiments are denoted with the same reference numerals. A description of these structural members will be omitted. In FIG. 13, the rotating member 20 is shown in simplified form. The spring mechanism provided between the rotating member 20 and the rim 11 is the same as that in the previously described embodiments and thus an illustrative figure will not be provided here.

As shown in FIG. 13, a first support member 150 has a shaft 151 and a bracket 152 (first bracket). A tip end portion of the shaft 151 is inserted to the inside of the rim 11. As can be seen in FIGS. 13, 15, the bracket 152 has a tubular portion 152a, an upright portion 152b, and a pair of stoppers 152c. The tip end portion of the shaft 151 is inserted in the tubular portion 152a. The upright portion 152b is T-shaped and extends upwards in a vertical manner from the tubular portion 152a. The pair of stoppers 152c extends downwards from the tubular portion 152a. Receiving portions 152d are provided in an upper end portion of the upright portion 152b and are disposed away from each other in front-rear direction. Upper ends of the two suspension elements 70 are connected to the receiving portions 152d.

On the other hand, the second support member 160 is provided as in the third embodiment and includes the short shaft 161 and the bracket 162 (second bracket). The bracket 162 has an inverted T-shaped. Receiving portions (not shown) are provided in a lower end portion of the bracket 162 and are disposed away from each other in the front-rear direction. The lower ends of the two suspension elements 70 are connected to the receiving portions of the bracket 162.

In the fourth embodiment, a link mechanism 190, different from the link mechanism of the third embodiment, is used as a lateral force support mechanism. The link mechanism 190 has first and second links 195, 196, and first to third connecting joints 191 to 193. Axes lines of the connecting joints 191 to 193 are parallel with the center axis line of the wheel 10. The links 195, 196 and the connecting joints 191 to 193 of the link mechanism 190 are positioned between the suspension elements 70, and are positioned on the same vertical plane as the suspension elements 70, which is orthogonal to the center axis of the wheel 10.

The shaft 151 of the first support member 150 and the first link 195 are coupled rotatably via the first connecting joint 191. The bracket 162 of the second support member 160 and the second link 196 are coupled rotatably via the second connecting joint 192. Further, the first link 195 and the second link 196 are coupled rotatably via the third connecting joint 193. The third connecting joint 193 is positioned apart from the line connecting the first and the second connection joints 191, 193. In this embodiment, the first link 195 is positioned substantially vertically, and the second link 196 is positioned substantially horizontally.

The connecting joints 191 to 193 include pairs of angular bearings 191x, 192x, 193x (connecting elements) positioned apart from each other in the axial direction. The pair of angular bearings 191x have opposite contact angles to each other. The pair of angular bearings 192x and the pair of angular bearings 193x are the same. Accordingly, the angular bearings 191x, 192x, 193x receive lateral force in addition to radial force. Note that, commercially available angular bearings may be used for the angular bearings 191x, 192x, 193x.

The above structure will now be described more specifically. The tip end portion of the shaft 151 is fitted into the inner periphery of the pair of angular bearings 191x of the first connecting joint 191. Outer tubes 191a are fitted to the outer periphery of the angular bearings 191x. The previously described tubular portion 152a of the first bracket 152 is interposed between the pair of angular bearings 191x. Further, a nut 197 is tightened onto a tip end screw portion of the shaft 151 such that the tubular portion 152a and the pair of angular bearings 191x are fixed between the nut 197 and the stepped portion of the shaft 151.

The second and third connecting joints 192, 193 are configured with the same structure, and respectively include the angular bearings 192x, 193x, outer tubes 192a, 193a positioned on the outer periphery of the angular bearings 192x, 193x, and short shafts 192b, 193b positioned on the inner periphery of the angular bearings 192x, 193x. A tubular spacer 192c is disposed between the pair of angular bearings 192x, and similarly a tubular spacer 193c is disposed between the pair of angular bearings 193x.

As shown in FIG. 15, opposite ends of the first link 195 are fixed to the outer tubes 191a, 193a of the first and third connecting joints 191, 193. The first link 195 is positioned between the pair of stoppers 152c of the first bracket 152 described previously.

Opposite ends of the second link 196 is fixed to the spacers 192c, 193c of the second and third connecting joints 192, 193. Openings 192w, 193w are respectively formed in the outer tubes 192a, 193a of the second and third connecting joints 192, 193. The second link 196 passes through the openings 192w, 193w with a play of a predetermined angular range.

The outer tube 192a of the second connecting joint 192 is fixed to the lower end portion of the bracket 162 of the second support member 160. As a result, the shaft 151 of the first support member 150 and the bracket 162 of the second support member 160 are coupled via the link mechanism 190.

Next, the operation of the link mechanism 190 will be explained in more detail. As described previously, since the connecting joints 191 to 193 include the angular bearings 191x to 193x, relative movement in the center axis direction of the wheel 10 with respect to the vehicle body is inhibited. Accordingly, stable running of the vehicle is possible. Further, relative movement in the axial direction of the support members 150 and 160 is inhibited, which makes it possible to protect the suspension elements 70 provided between the support members 150, 160.

The first link 195 is connected to the shaft 151 via the first connecting joint 191 so as to be capable of relative rotation. In addition, the second link 196 is connected to the bracket 162 of the second support member 160 and the first link 195 via the second connecting joint 192 and the third connecting joint 193 so as to be capable of relative rotation. As a result, the link mechanism 190 allows up-down direction and front-rear direction variation of the wheel 10 with respect to the vehicle body, and rotation of the wheel 10 around the center axis of the wheel 10. Accordingly, the link mechanism 90 does not obstruct the operation of the suspension elements 70 and the spring mechanism.

As shown in FIGS. 14, 15, the pair of stoppers 152c of the first bracket 152 control the relative rotation of the first link 195 with respect to the shaft 151 within a predetermined angular range Θa' (for example, thirty degrees). Further, the circumferential direction ends of the openings 192w, 193w of the outer tubes 192a, 193a of the connecting joints 192, 193 abut with the second link 196 so as to control the relative rotation of the second link 196 with respect to the first link 195 within a predetermined angular range Θb'. As a result, the relative movement region of the second connecting joint 192 with respect to the first connecting joint 191, namely, the relative movement region of the wheel 10 with respect to the vehicle body, is restricted to the region denoted by the reference numeral Al in FIG. 14. Further, the relative movement region of the wheel 10 with respect to the rotating member 20 is restricted to the region denoted by the reference numeral A2 by the spring receiving portion 34 in the spring mechanism 30 (refer to FIG. 2) abutting with the outer spring receiving ring 31. As a result of this structure, the actual relative movement region of the wheel 10 with respect to the vehicle body is restricted to the region denoted by the reference numeral A3. This restriction region A3 can be made to be corresponds to a restriction region A4 that is necessary for vehicle design requirements.

When a rotational moment around the axis that is orthogonal to the center axis of the wheel 10 (an axis that is orthogonal to the paper surface of the FIG. 13) is applied to the link mechanism 190 from the wheel 10, torsional load generated by the rotational moment can be received by the respective pairs of angular bearings 191x, 192x, 193x of the connecting joints 191 to 193 positioned apart from each other. As a result, the durability of the link mechanism 40 is high and the wheel 10 can be stably supported.

As shown in FIG. 13, a seal structure can easily be added to the connecting joints 191 to 193 in order to inhibit entry of water, dirt, etc. More specifically, caps 201, 202 are fixed by screws to opposite ends of the outer tube 193a of the third connecting joint 193 with O-rings therebetween. In this seal structure, friction caused by rotation does not affect the O-rings, and thus the O-rings are highly durable. Further, seal rings 200 are attached to an inner periphery of an intermediate tube disposed inside of the outer tube 193a. The seal rings 200 are disposed such that the angular bearings 193x are sandwiched between the seal rings 200 and the caps 201, 202. These seal rings 200 contact with the outer periphery of the spacer 193c and inhibit entry of water or the like from the opening 193w. Friction does not affect these seal bearings 200 during high speed rotation of the wheel 10, and thus the seal bearings 200 are highly durable. The second connecting joint 192 is sealed in the same way.

A cap 203 with O-ring is attached to one end of the outer tube 191a of one of the angular bearings 191x in the first connecting joint 191. A seal ring 204 is attached to the other end of the outer tube 191a and contacts with the tubular portion 152a of the first bracket 152. Accordingly, sealing of one of the angular bearings 191x is provided. A seal ring 205 is attached to one end of the outer tube 191a of the other angular bearing 191x of the first connecting joint 191 and contacts with the tubular portion 152a of the first bracket 152. A seal ring 207 is attached to the other end of the outer tube 191a and contacts with a receiving plate 206 fixed to the shaft 151. Accordingly, sealing of the other angular bearing 191x is provided. The seal structure of the first connecting joint 191 is not affected by friction during rotation.

Note that, sealing of the pair of angular bearings 165 that support the second bracket 162 is provided using a cap 208 with O-ring attached to the disk 12 and a seal ring 209. The seal ring 209 is attached to the inner periphery of the support hole 12x and contacts with the shaft 161 of the second support member 160.

In the fourth embodiment, the rotating member 20 may be coupled to the rotating drive train of the vehicle body. Further, tapered roller bearings may be used instead of angular ball bearings so as to provide bearings that are capable of receiving lateral force as well as radial force.

The invention is not limited to the above embodiments and permits of various modifications. For example, in the above embodiments, two inclined suspension elements are provided that soften and absorb not only the up-down direction shock and vibration but also front-rear direction shock and vibration. However, one vertical suspension element may be used.

DESCRIPTION OF THE REFERENCE NUMERALS

Figure 1:
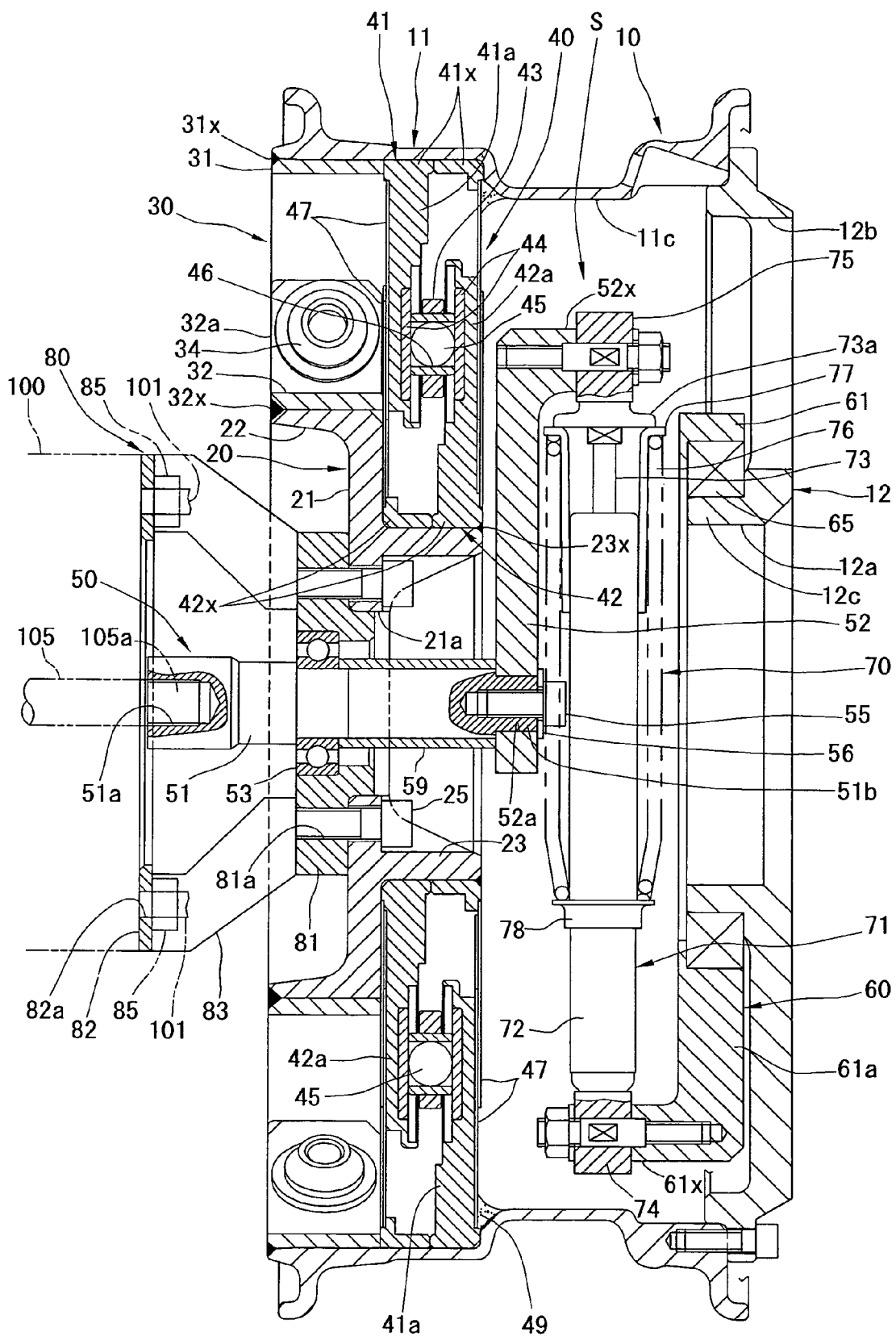
FIG. 1 is a longitudinal cross section of a wheel assembly according to a first embodiment of the present invention.
Figure 2:
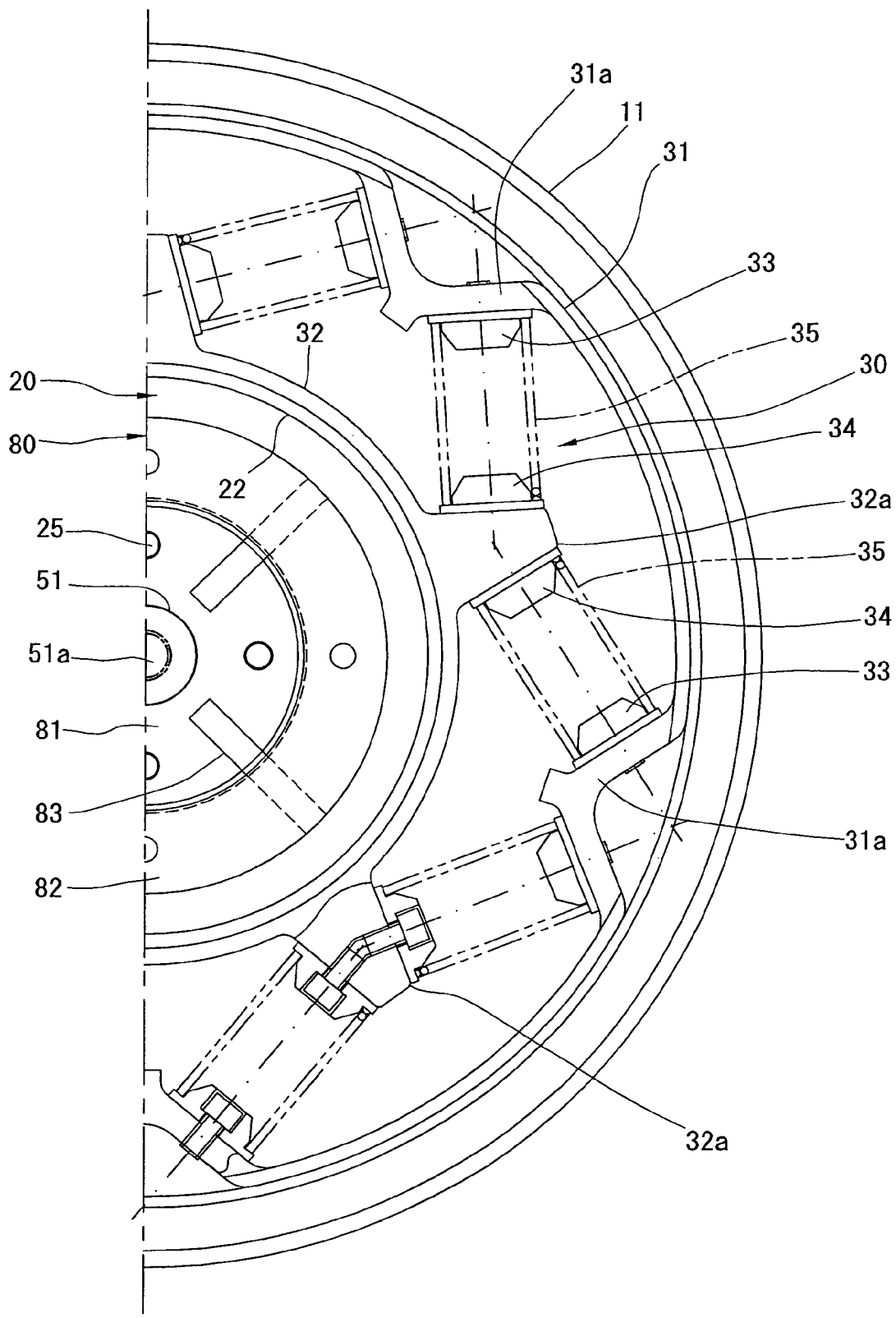
FIG. 2 is a side view showing the same wheel assembly when viewed from the left side of FIG. 1.
Figure 3:
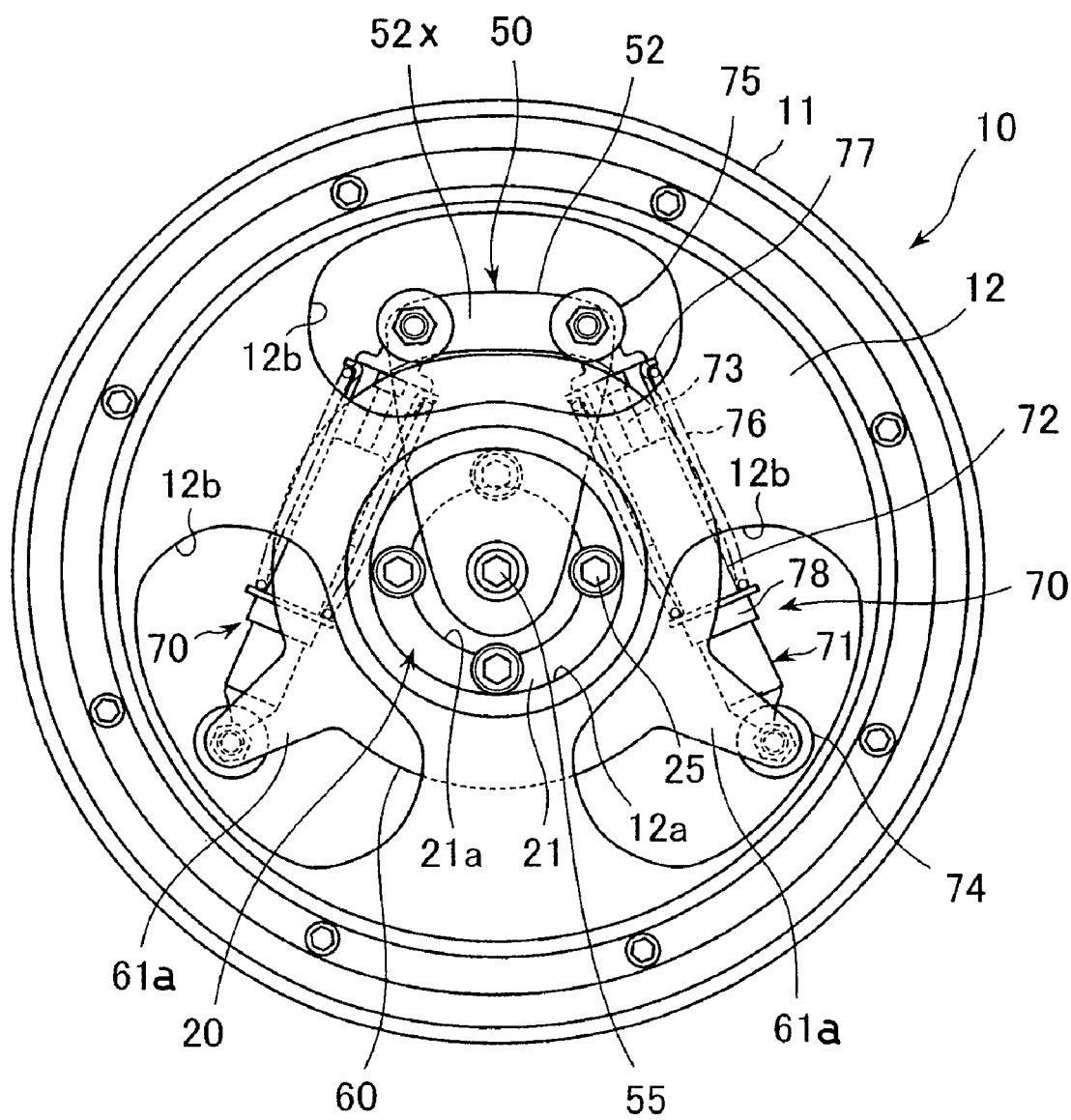
FIG. 3 is a side view showing the same wheel assembly when viewed from the right side of FIG. 1.
Figure 4:
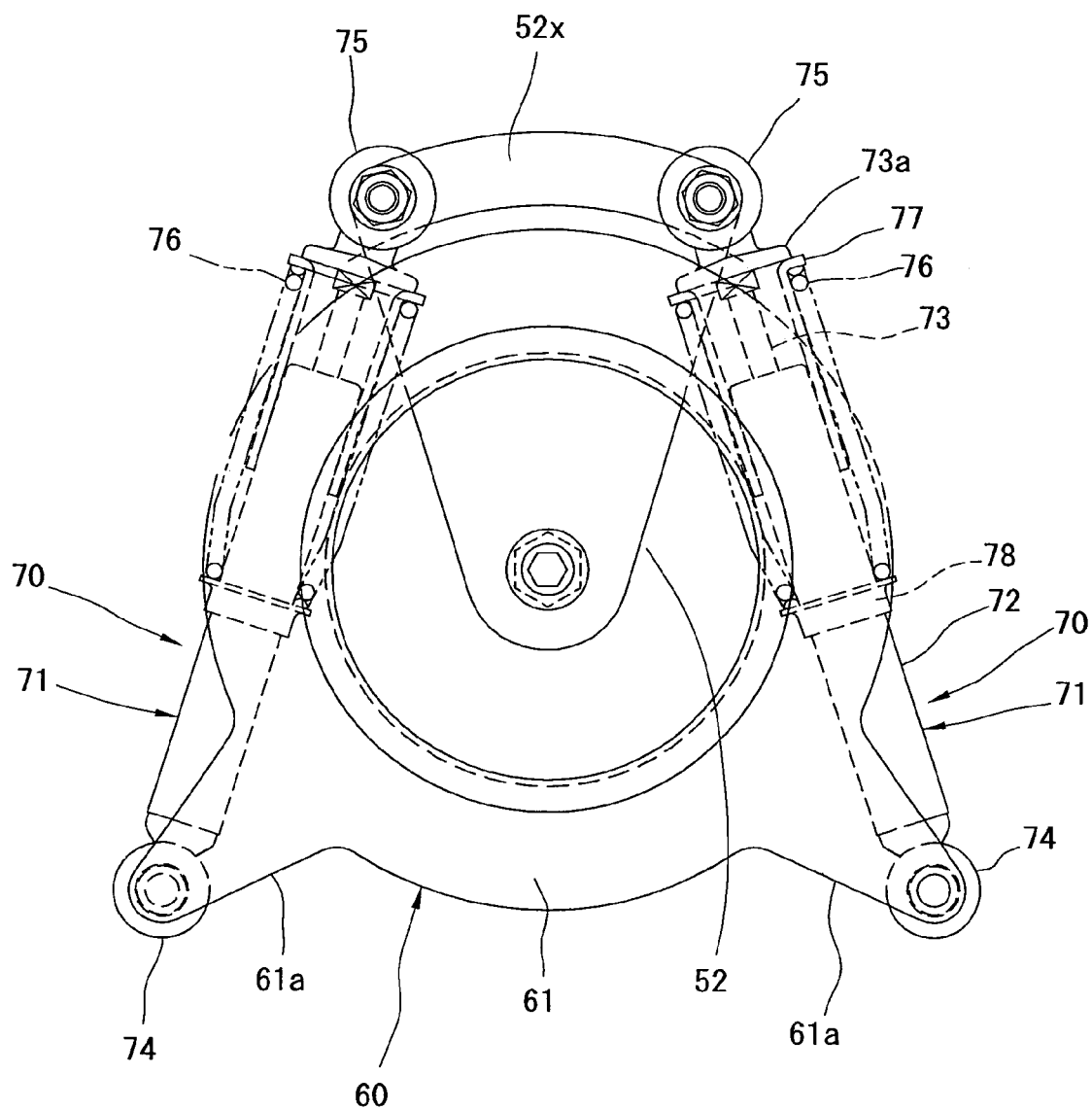
FIG. 4 is a view from the right side of FIG. 1 showing suspension elements and first and second support members that support the suspension elements in the same wheel assembly.
Figure 5:
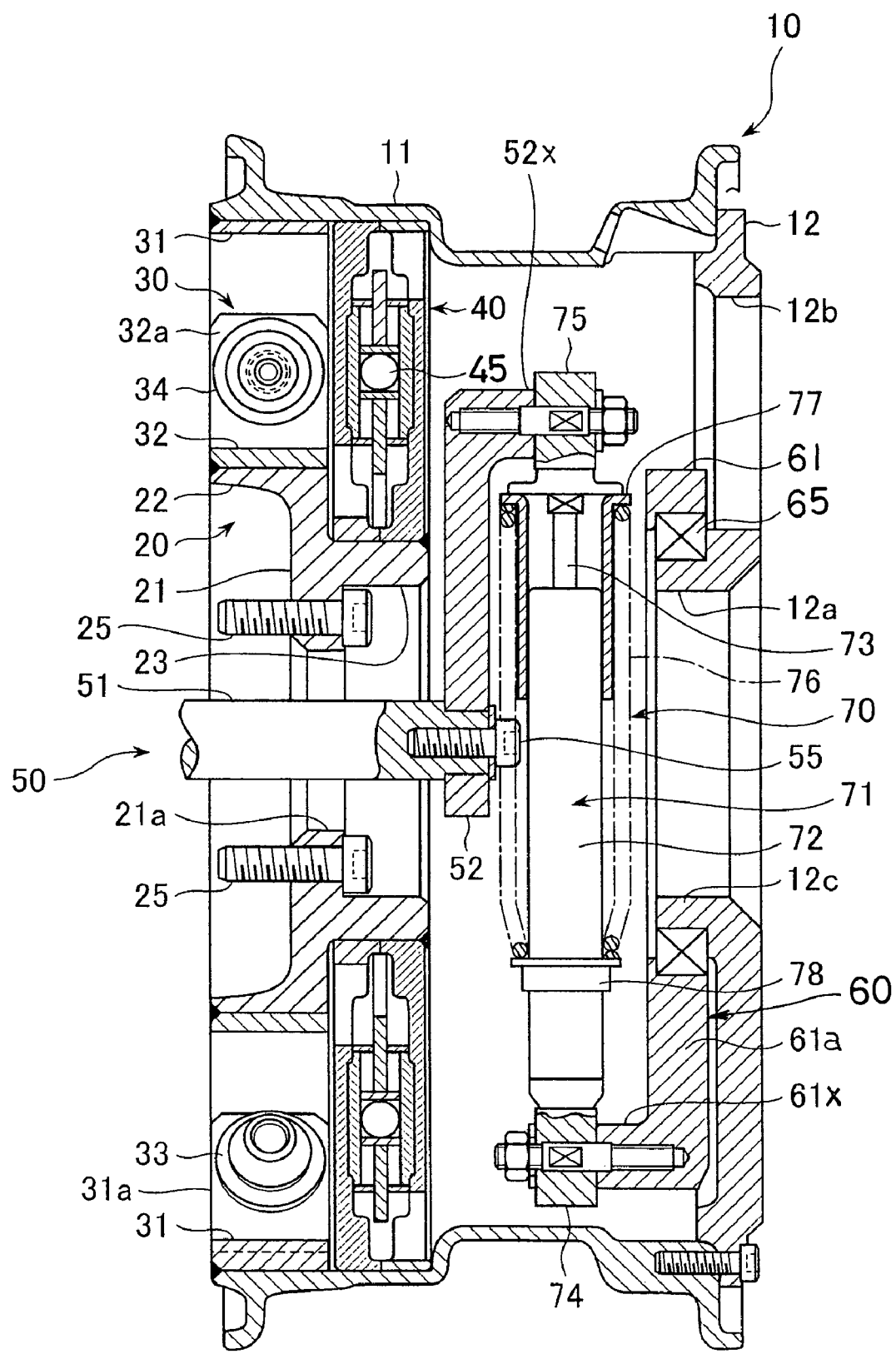
FIG. 5 is a longitudinal section of a wheel assembly according to a second embodiment of the present invention.
Figure 6:
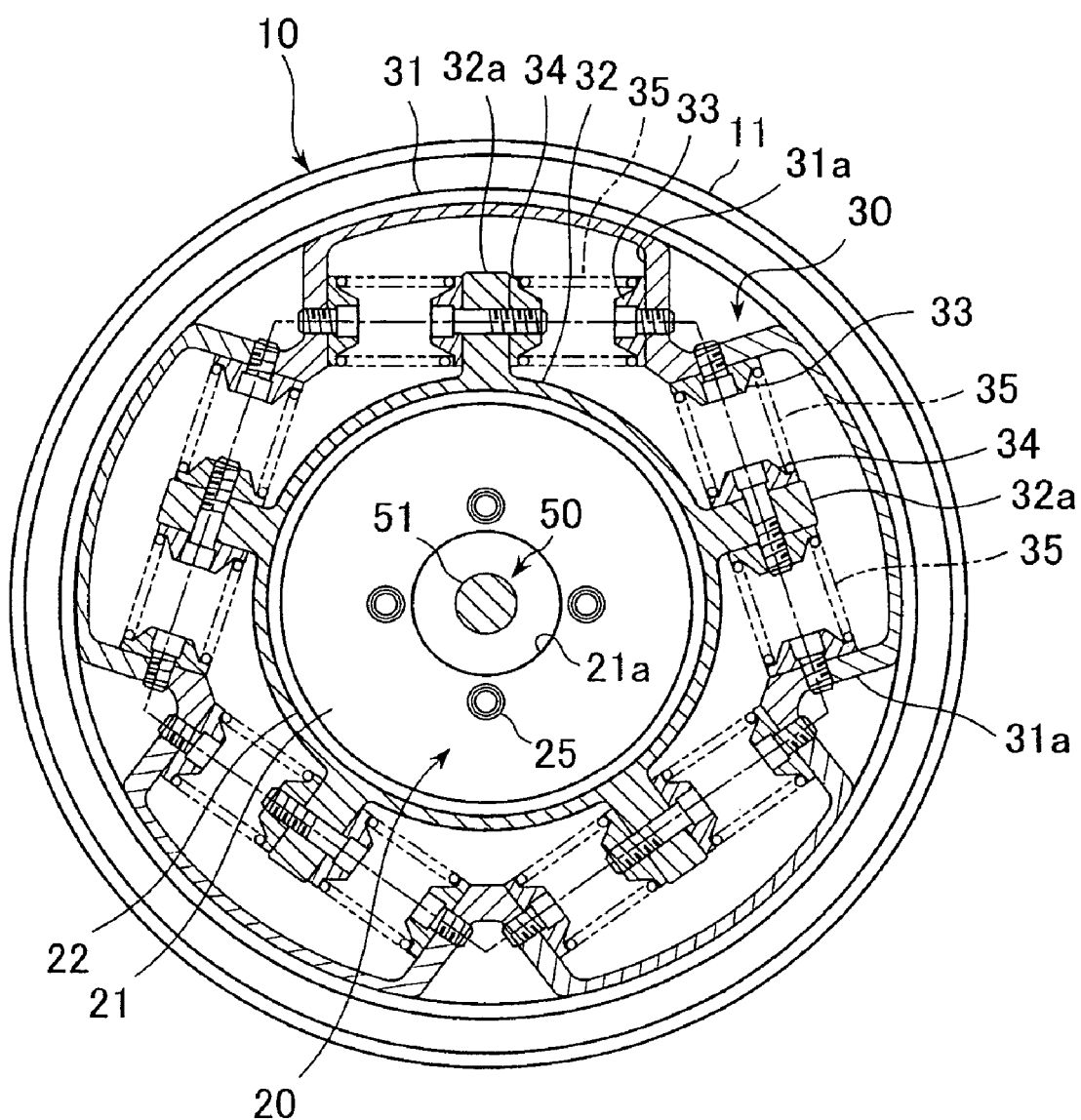
FIG. 6 is a side view, partly in section, of the same wheel assembly when viewed from the left side of FIG. 5.
Figure 7:
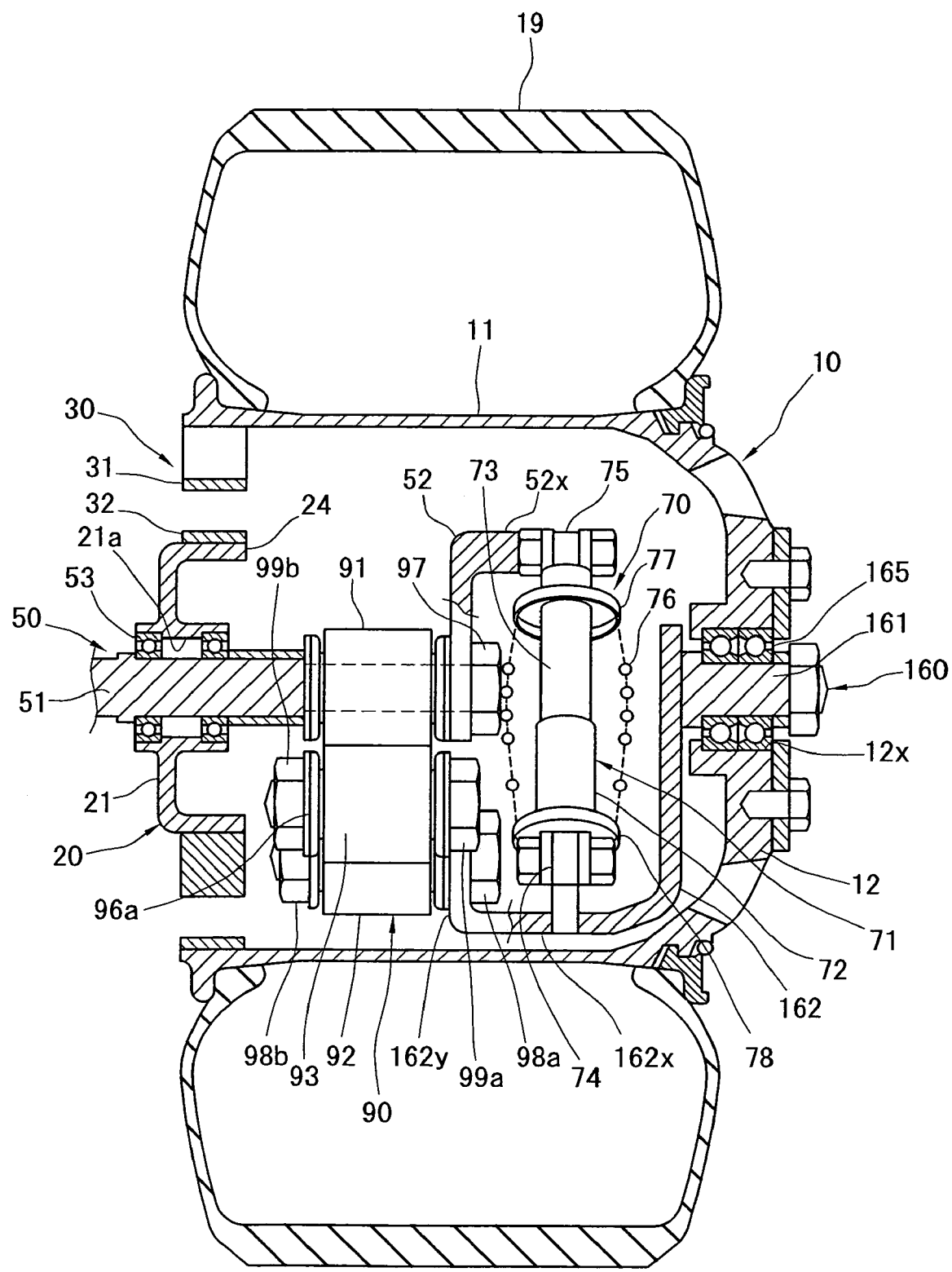
FIG. 7 is a longitudinal section of a wheel assembly according to a third embodiment of the present invention.
Figure 8:
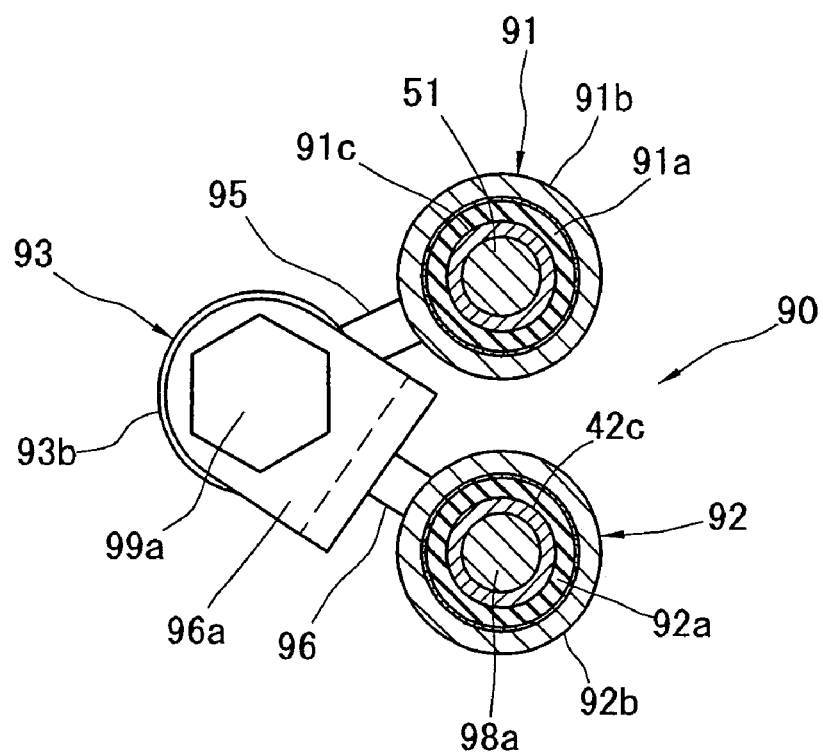
FIG. 8 is a side sectional view of a link mechanism of FIG. 7.
Figure 9:
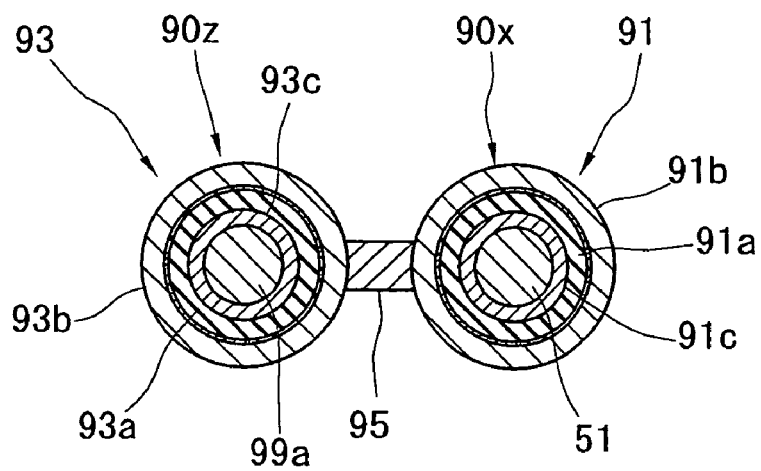
FIG. 9 is a side sectional view of first and third rubber bushes of the same link mechanism.
Figure 10:
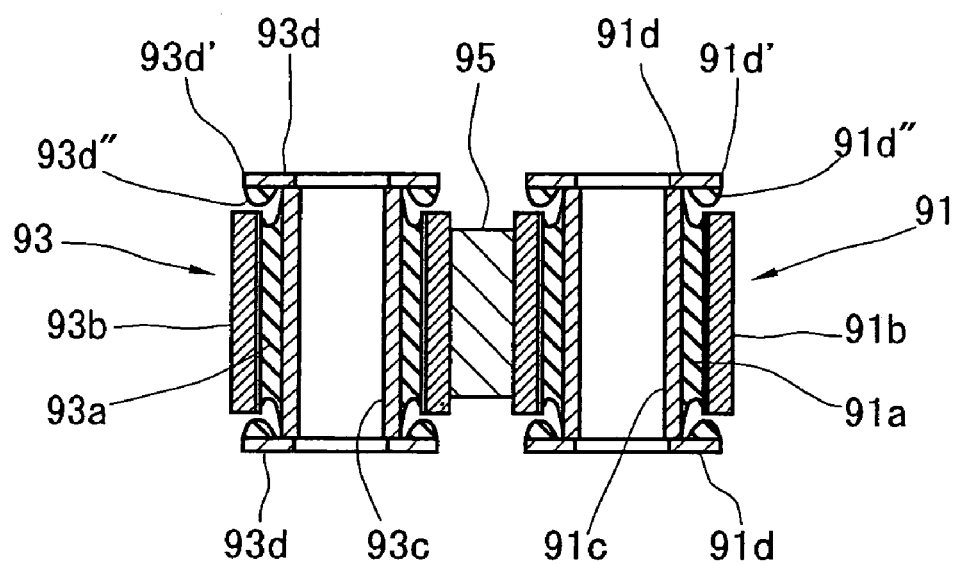
FIG. 10 is a plane sectional view of the first and third rubber bushes of the same link mechanism.
Figure 11:
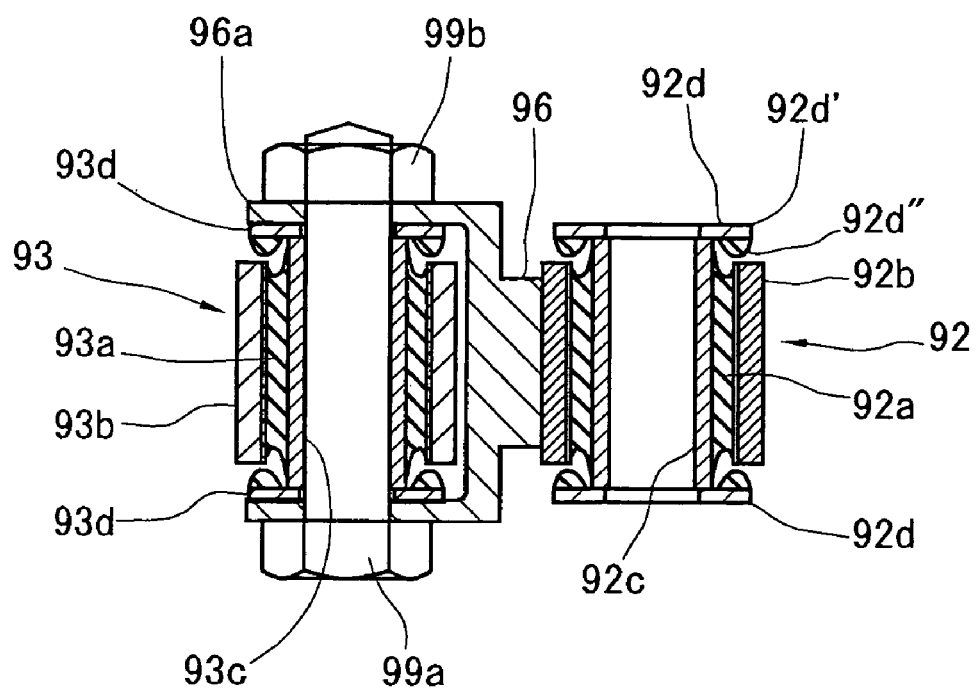
FIG. 11 is a plane sectional view of a second rubber bush and the third rubber bush of the same link mechanism.
Figure 12:
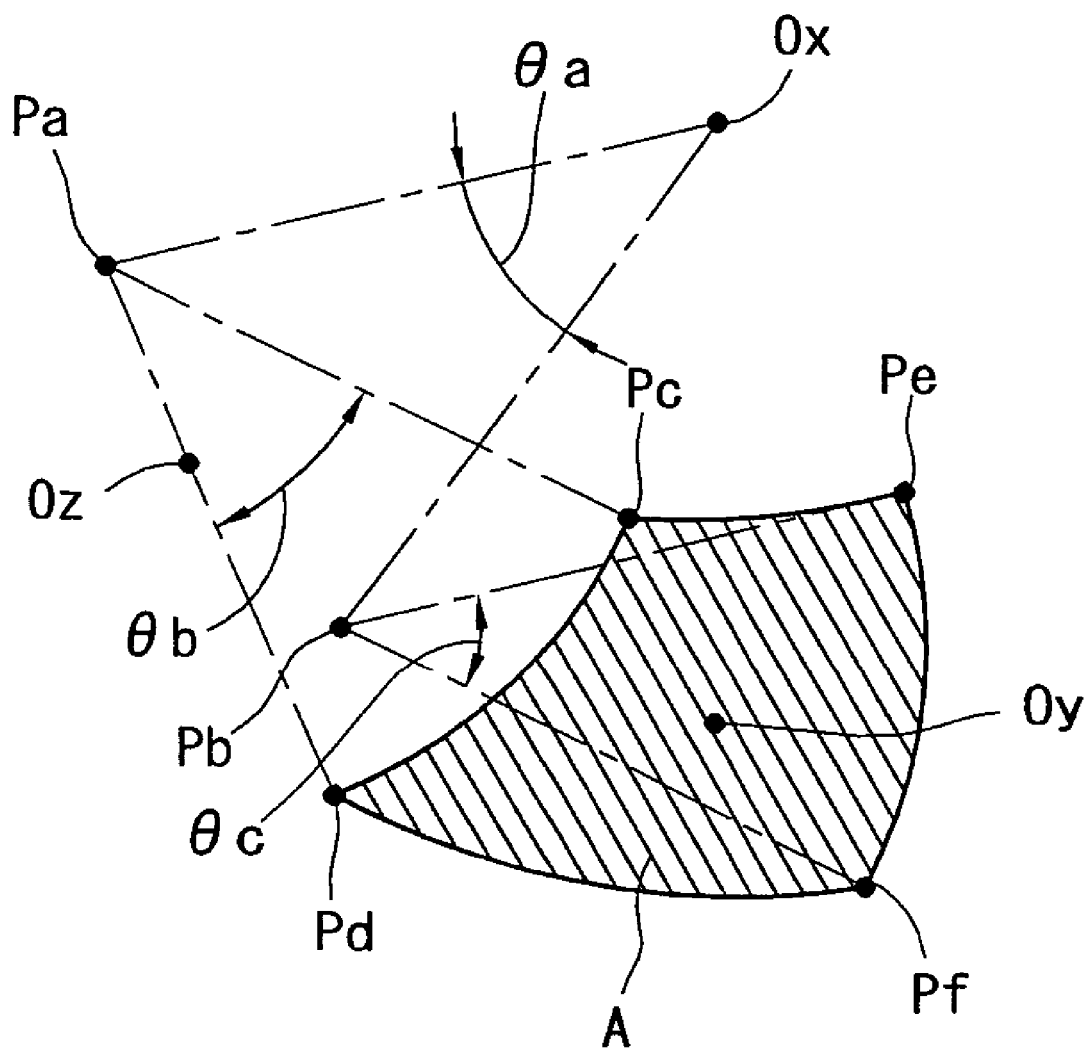
FIG. 12 is an explanatory figure showing the relative movement range of a wheel whose movement is restricted by the same link mechanism with respect to a vehicle body.
Figure 13:
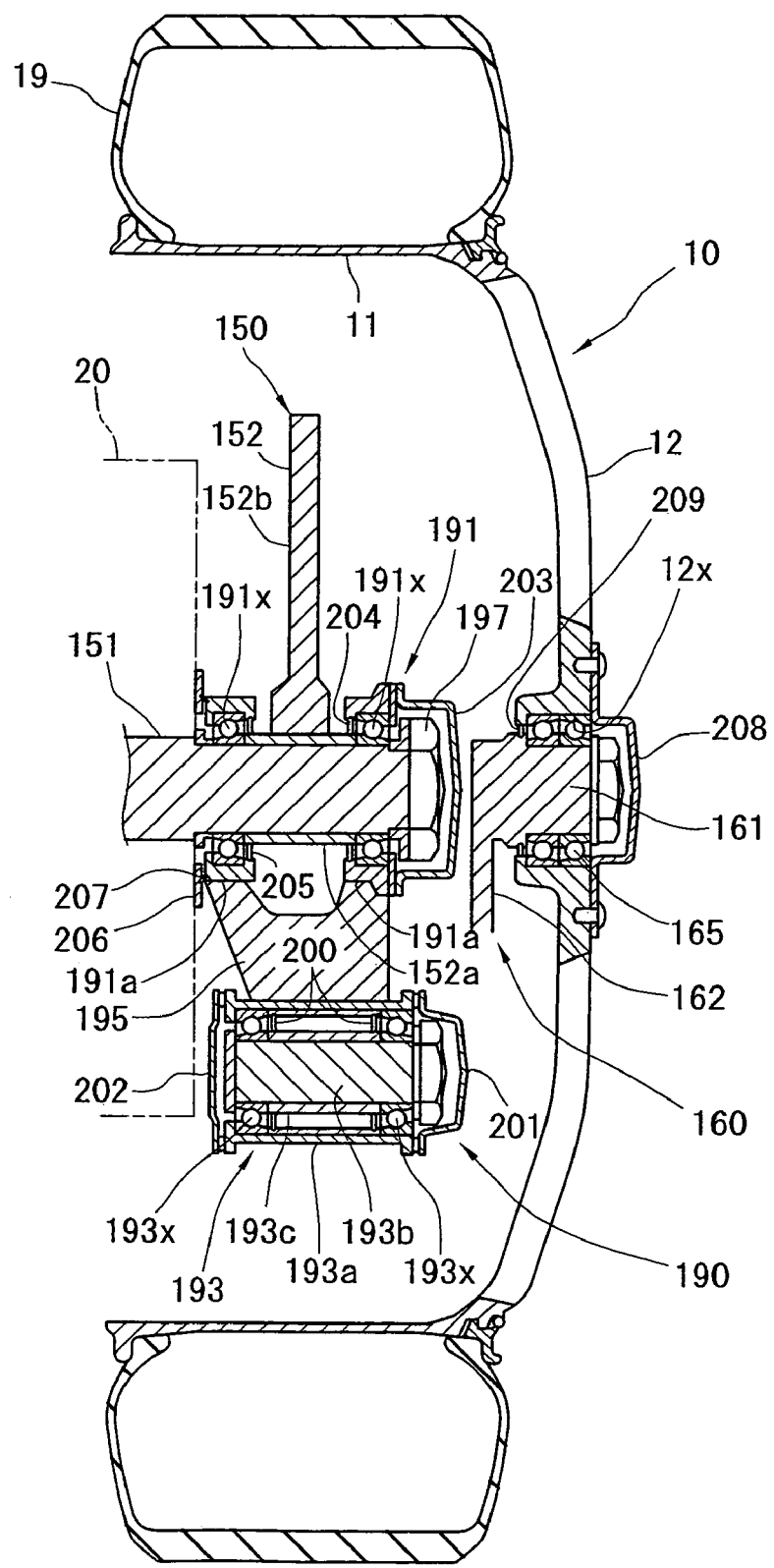
FIG. 13 is a longitudinal cross section of a wheel assembly according to a fourth embodiment of the invention.
Figure 14:
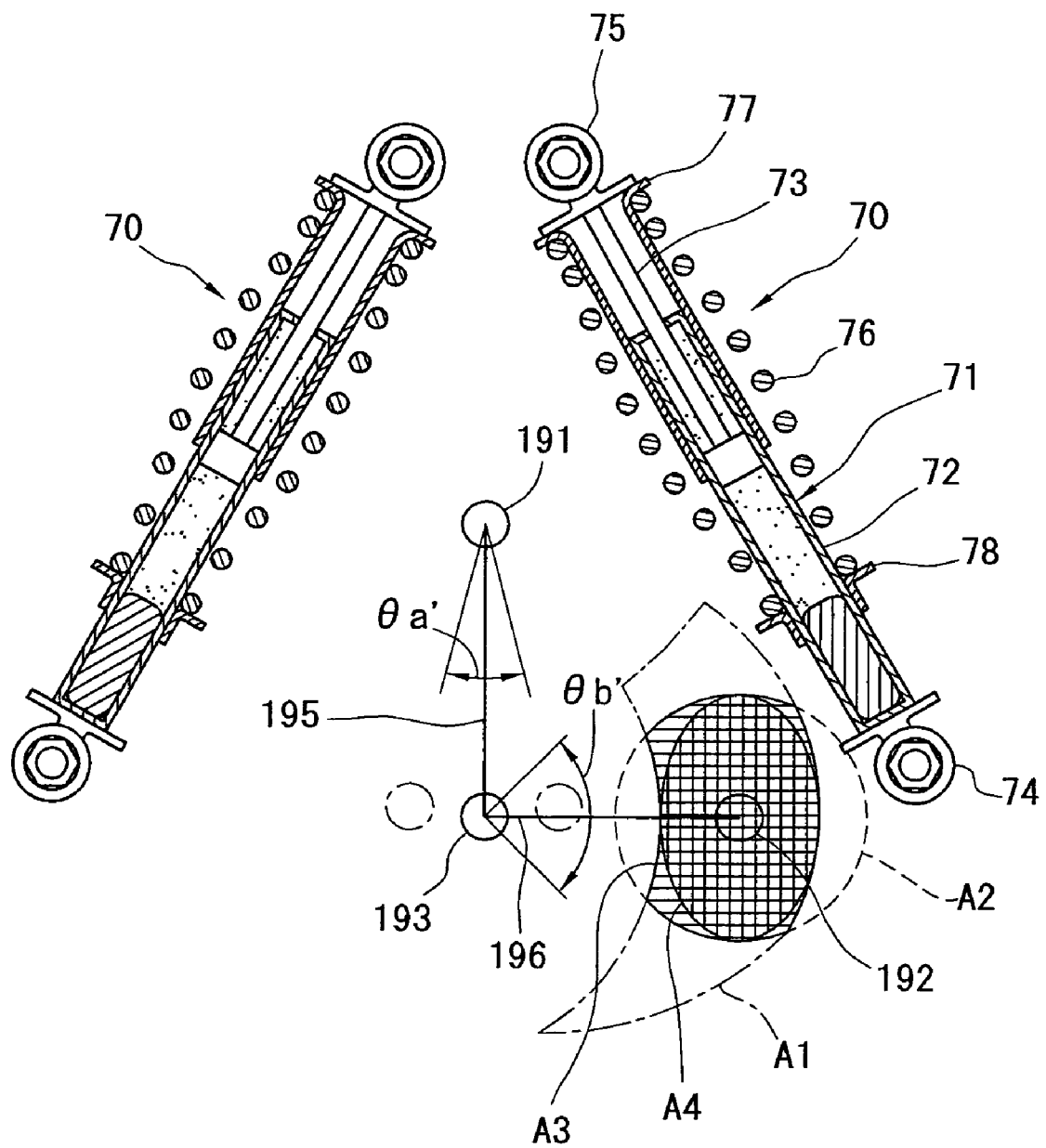
FIG. 14 is an explanatory figure showing positioning of suspension elements and a link mechanism, and the relative movement range of the wheel with respect to the vehicle body in the fourth embodiment.
Figure 15:
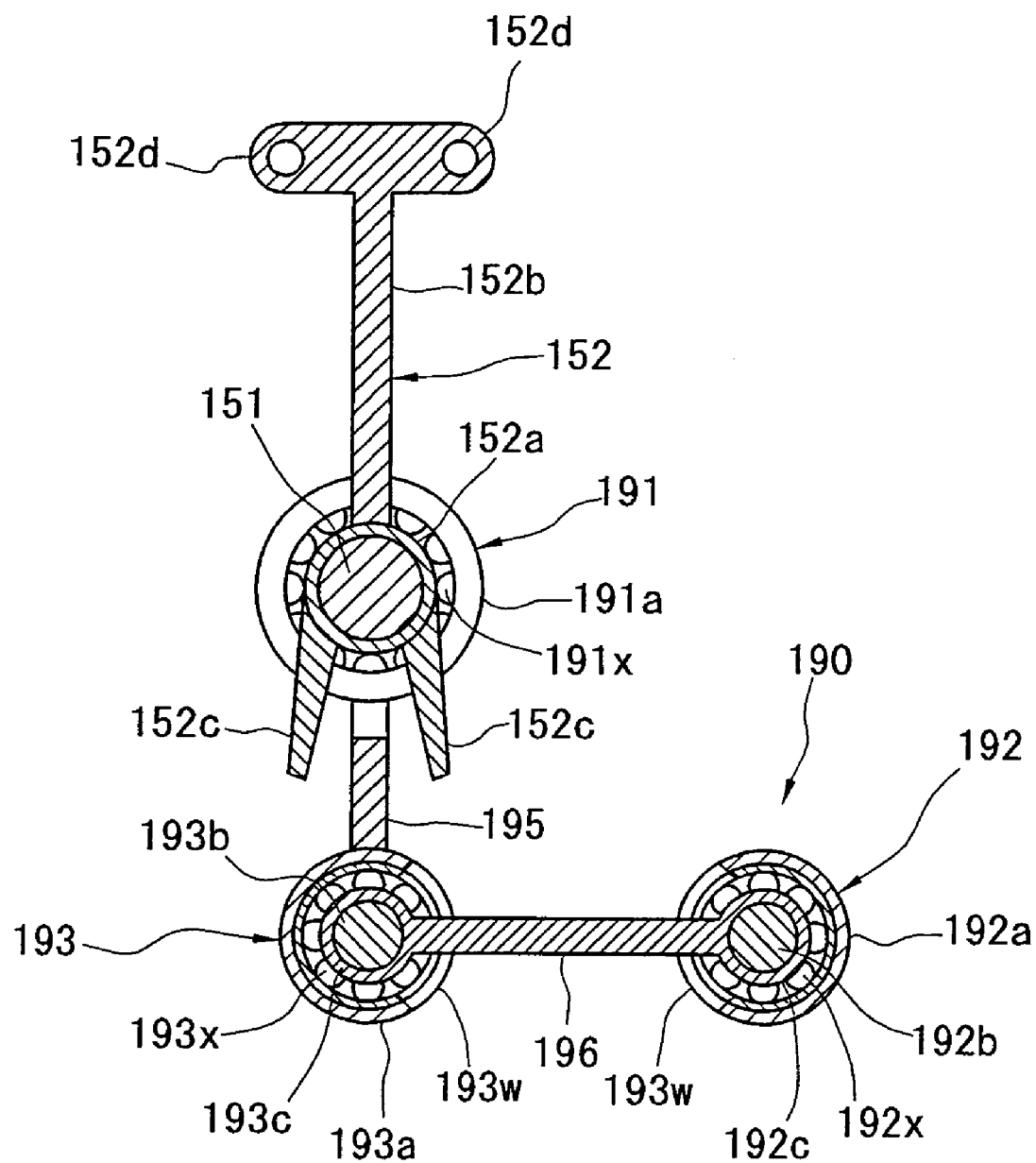
FIG. 15 is a side sectional view of a link mechanism of the fourth embodiment.

S SUSPENSION DEVICE
10 WHEEL
11 RIM
12 DISK
20 ROTATING MEMBER
30 SPRING MECHANISM
31a, 32a SPRING RECEIVING PORTION
35 COMPRESSION COIL SPRING (SPRING MEMBER)
40 FLAT BEARING (LATERAL FORCE SUPPORT MECHANISM)
41 OUTER RING
42 INNER RING
41a, 42a RECEIVING PLATE PORTION
45 BALL
50, 150 FIRST SUPPORT MEMBER
51, 151 SHAFT
52, 152 FIRST BRACKET
60, 160 SECOND SUPPORT MEMBER
61, 161 SECOND BRACKET
70 SUSPENSION ELEMENT
71 FLUID DAMPER (DAMPER, SHOCK ABSORBER)
76 COMPRESSION COIL SPRING (RETURN SPRING)
90, 190 LINK MECHANISM (LATERAL FORCE SUPPORT MECHANISM)
91, 92, 93 FIRST TO THIRD RUBBER BUSHES (FIRST TO THIRD CONNECTING JOINTS, CONNECTING ELEMENTS)
95, 96 FIRST, SECOND LINKS
191, 192, 193 FIRST TO THIRD CONNECTING JOINTS
191x, 192x, 193x ANGULAR BEARINGS (CONNECTING ELEMENTS)
195, 196 FIRST AND SECOND LINKS

The invention claimed is:

1. A wheel assembly including a wheel with a ring-shaped rim, comprising:
a first support member mounted on a vehicle body and extending to an inside of said rim,
a second support member coupled to said wheel at the inside of said rim rotatably wound a center axis of said wheel, and
first and second suspension elements mounted in a generally raised position between said first support member and said second support member at the inside of said rim, said first and second suspension elements being inclined in different directions to the front and rear with respect to a vertical axis so as to soften and absorb shock and vibration in an up-down direction and a front-rear direction that are transmitted from said wheel.

2. The wheel assembly according to claim 1, wherein each of said first and second suspension elements includes a fluid damper and a compression coil spring.

3. The wheel assembly according to claim 1, further comprising:
a rotating member supported by said vehicle body and disposed at the inside of said rim, and
a spring mechanism mounted between an inner periphery of said rim and an outer periphery of said rotating member,
wherein said spring mechanism includes a plurality of spring elements that are positioned in a circumferential direction.

4. The wheel assembly according to claim 3, wherein
said spring mechanism includes a plurality of first spring receiving portions which protrude radially inwardly and are positioned at substantially equal distances in the circumferential direction in the inner periphery of said rim, and a plurality of second spring receiving portions which protrude radially outwardly and are positioned at substantially equal distances in the circumferential direction in an outer periphery of said rotating member, and
a compression coil spring which acts as said spring elements and is interposed between said first spring receiving portion and said second spring receiving portion that are positioned to face each other in the circumferential direction.

5. The wheel assembly according to claim 3, wherein said wheel includes a disk provided at a periphery edge of said rim at the opposite side of said rim from said vehicle body, said rotating member is positioned at the vehicle body side, and said first and second suspension elements are positioned between said disk and said rotating member.

6. The wheel assembly according to claim 5, wherein
said first support member includes a shaft and a first bracket, said shaft extending in the direction of the center axis of said wheel and passing through said rotating member, said shaft having a tip end portion that is positioned at the inside of said rim, and said first bracket being mounted at the tip end portion of said shaft,
said second support member includes a second bracket coupled to said disk rotatably around the center axis of said wheel,
said first and second brackets include receiving portions that face each other in the up-down direction, and
upper ends and lower ends of said first and second suspension elements are respectively coupled to said receiving portions of said first and second brackets.

7. The wheel assembly according to claim 6, further comprising:
a bearing interposed between said shaft of said first support member and said rotating member.

8. The wheel assembly according to claim 3, further comprising:
a lateral force support mechanism that is provided between said rotating member and said wheel at the inside of said rim, said lateral force support mechanism permitting relative displacement of said wheel with respect to said vehicle body in a plane that is orthogonal to the center axis of said wheel and inhibiting relative displacement of said wheel in the direction of the center axis of said wheel.

9. The wheel assembly according to claim 8, wherein said lateral force support mechanism is a flat bearing, said flat bearing having an outer ring fixed to the inner periphery of said rim, an inner ring fixed to the outer periphery of said rotating member, a receiving plate portion which is formed in said outer ring and protrudes radially inwardly, and a receiving plate portion which is formed in said inner ring and protrudes radially outwardly, and a ball interposed between said receiving plate portion and said receiving plate portion.

10. The wheel assembly according to claim 1, further comprising:
a lateral force support mechanism which is provided between said first support member and said second support member at the inside of said rim, said lateral, force support mechanism permitting relative displacement of said wheel with respect to said vehicle body in a plane that is orthogonal to the center axis of said wheel and inhibiting relative displacement of said wheel in the direction of the center axis of said wheel.

11. The wheel assembly according to claim 10, wherein said lateral force support mechanism is a link mechanism.

12. The wheel assembly according to claim 11, wherein said first and second suspension elements are positioned respectively to the front and rear of said link mechanism such that said link mechanism is interposed between said first and second suspension elements.

13. The wheel assembly according to claim 11, wherein
said link mechanism includes first and second links, and first, second and third connecting joints,
said first support member and said first link are rotatably coupled to each other via said first connecting joint,
said second support member and said second link are rotatably coupled to each other via said second connecting joint,
said first link and said second link are rotatably coupled to each other via said third connecting joint, and
said third connecting joint is positioned apart from a line that connects said first and second connecting joints.

14. The wheel assembly according to claim 13, wherein
said first support member includes a shaft and a first bracket, said shaft extending in the direction of the center axis of said wheel and having a tip end portion that is positioned at the inside of said rim, and said first bracket being mounted at the tip end portion of said shaft,
said second support member includes a second bracket coupled to a disk of said wheel rotatably around the center axis of said wheel,
said first and second brackets include receiving portions that face each other in the up-down direction,
upper ends and lower ends of said first and second suspension elements are respectively coupled to said receiving portions of said first and second brackets, and
said first link is coupled to said shaft of said first support member via said first connecting joint.

15. The wheel assembly according to claim 13, wherein said fast, second and third joints are provided with respective pairs of connecting elements that are positioned apart from each other in the direction of the center axis of said wheel.

16. The wheel assembly according to claim 13, wherein said first and second suspension elements, said first, second and third connecting joints, and said first and second links are substantially positioned on the same vertical plane, the vertical plane being orthogonal to the center axis of said wheel.

17. The wheel assembly according to claim 13, wherein said first, second and third connecting joints include bearings that receive both radial force and lateral force.

18. The wheel assembly according to claim 17, wherein said first link extends downward, and said first bracket has a pair of stoppers which are positioned at opposite sides of said first link and restrict a rotational range of movement of said first link.

19. The wheel assembly according to claim 18, wherein
said first connecting joint has an outer tube, and said bearing is provided between said outer tube and said shaft of said first support member,
said second connecting joint and said third connecting joint have respective short shafts and respective outer tubes, said bearings are provided between said respective short shafts and said outer tubes, said outer tube of said second connecting joint is fixed to said second bracket, opposite ends of said first link are fixed to said outer tube of said first connecting joint and said outer tube of said third connecting joint, and opposite ends of said second link are fixed to said short shaft of said second connecting joint and said short shaft of said third connecting joint, and
openings are respectively formed in said outer tubes of said second and third connecting joints, said second link passing through said openings and being capable of rotating within a predetermined angular range, the opposite ends of said openings in a circumferential direction acting as stoppers that regulate the angular range of rotation of said second link.

20. The wheel assembly according to claim 13, wherein said first second and third connecting joints include respective rubber bushes.

21. The wheel assembly according to claim 3, wherein said rotating member is coupled to a rotating element of a brake, and brake torque of said brake is transmitted to said wheel via said rotating member and said spring mechanism.

22. The wheel assembly according to claim 3, wherein said rotating member is coupled to a rotating drive train of the vehicle, and drive torque from said rotating drive train is transmitted to said wheel via said rotating member and said spring mechanism.

23. The wheel assembly according to claim 1, wherein said first and second suspension elements are away from each other in the front-rear direction.

* * * * *

UNITED STATES PATENT AND TRADEMARK OFFICE
CERTIFICATE OF CORRECTION

PATENT NO. : 7,389,999 B2
APPLICATION NO. : 10/559195
DATED : June 24, 2008
INVENTOR(S) : Yoshiaki Kimura et al.

Page 1 of 1

It is certified that error appears in the above-identified patent and that said Letters Patent is hereby corrected as shown below:

In the Claims:

In Claim 1, column 17, line 62, the word "wound" should be --around--.

In Claim 10, column 19, line 14, after the word "lateral" the "," should be deleted.

In Claim 15, column 20, line 2, the word "fast" should be --first--.

In Claim 20, column 20, line 41, after the word "first", a --,-- should be added.

Signed and Sealed this

Eighteenth Day of November, 2008

JON W. DUDAS
*Director of the United States Patent and Trademark Office*